United States Patent
Okamoto et al.

(10) Patent No.: US 11,061,687 B2
(45) Date of Patent: Jul. 13, 2021

(54) APPARATUS AND METHOD FOR PROGRAM GENERATION

(71) Applicant: FUJITSU LIMITED, Kawasaki (JP)

(72) Inventors: Hiroaki Okamoto, Atsugi (JP); Tsuyoshi Nagato, Isehara (JP); Tetsuo Koezuka, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 218 days.

(21) Appl. No.: 15/945,276

(22) Filed: Apr. 4, 2018

(65) Prior Publication Data
US 2018/0225125 A1    Aug. 9, 2018

Related U.S. Application Data

(63) Continuation of application No. PCT/JP2015/079759, filed on Oct. 22, 2015.

(51) Int. Cl.
*G06F 9/44* (2018.01)
*G06K 9/62* (2006.01)
(Continued)

(52) U.S. Cl.
CPC .................. *G06F 9/44* (2013.01); *G06F 8/36* (2013.01); *G06F 8/44* (2013.01); *G06K 9/00664* (2013.01);
(Continued)

(58) Field of Classification Search
CPC ..... G06F 8/44; G06F 8/36; G06F 9/44; G06F 9/46; G06K 9/46
(Continued)

(56) References Cited

U.S. PATENT DOCUMENTS 6,052,678 A    4/2000 Itoh et al.
8,948,496 B2 *  2/2015 Huffman ............... G06F 19/321
                                                    382/154
(Continued)

FOREIGN PATENT DOCUMENTS

JP    7-225752    8/1995
JP    2006-79279    3/2006
(Continued)

OTHER PUBLICATIONS

Japanese Patent Office Action dated May 21, 2019 for application No. 2017-546333.
(Continued)

*Primary Examiner* — Claire X Wang
*Assistant Examiner* — Stephen M Brinich
(74) *Attorney, Agent, or Firm* — Staas & Halsey LLP

(57) ABSTRACT

There is provided a program generating apparatus including a generating unit and a genetic processing unit. The generating unit is configured to generate tree structures each representing an image classification program. Each of the tree structures has a first level group and a second level group. Elements of nodes in the first level group are selected from amongst image filters each used to apply preprocessing to an input image. An element of a node in the second level group is selected from amongst setting programs each used to set a different value as a control parameter for generating a classifier based on information obtained by execution of the elements selected for the nodes in the first level group. The genetic processing unit is configured to output, using genetic programming, a tree structure with a fitness score exceeding a predetermined threshold based on the tree structures.

10 Claims, 17 Drawing Sheets

(51) Int. Cl.
  *G06F 8/41*  (2018.01)
  *G06N 3/12*  (2006.01)
  *G06K 9/00*  (2006.01)
  *G06F 8/36*  (2018.01)
  *G06K 9/46*  (2006.01)
(52) U.S. Cl.
  CPC ............. *G06K 9/46* (2013.01); *G06K 9/6227* (2013.01); *G06K 9/6282* (2013.01); *G06N 3/126* (2013.01)
(58) Field of Classification Search
  USPC .................. 382/155–160, 224–228, 240
  See application file for complete search history.

(56) References Cited

U.S. PATENT DOCUMENTS

2010/0290700 A1  11/2010  Yokono
2011/0052063 A1*  3/2011  McAuley .............. G06K 9/527
                                                      382/180

FOREIGN PATENT DOCUMENTS

JP   2006-251955   9/2006
JP   2007-213480   8/2007
JP   2010-266983   11/2010

OTHER PUBLICATIONS

Atsushi Shiromaru et al., "Automatic Design of Image Recognition Algorithms using Genetic Programming", Technical Report of the Institute of Electronics, Information and Communication Engineers (IEICE), vol. 101, No. 363, Oct. 2001, pp. 21-28.
Atsushi Shiromaru et al., "Automatic Design of Image Recognition System Using Artificial Intelligence", Image Lab, vol. 13, No. 8, Aug. 2002, pp. 1-5 (with bibliographic pages).
Shinya Aoki et al., "Actit: Automatic Construction of Tree-structural Image Transformations", The Journal of the Institute of Image Information and Television Engineers of Japan, vol. 53, No. 6, Jun. 20, 1999, pp. 888-894
Written Opinion of the International Searching Authority dated Jan. 19, 2016 in corresponding International Patent Application No. PCT/JP2015/079759.
International Search Report dated Jan. 19, 2016 in corresponding International Patent Application No. PCT/JP2015/079759.
Japanese Platform for Patent Information English abstract for Japanese Patent Publication No. 2010-266983, published Nov. 25, 2011.
Japanese Platform for Patent Information English abstract for Japanese Patent Publication No. 2006-251955, published Sep. 21, 2006.
Japanese Platform for Patent Information English abstract for Japanese Patent Publication No. 2006-79279, published Mar. 23, 2006.
Japanese Platform for Patent Information English abstract for Japanese Patent Publication No. 7-225752, published Aug. 22, 1995.
Japanese Platform for Patent Information English abstract for Japanese Patent Publication No. 2007-213480, published Aug. 23, 2007.
Chinese Office Action dated Apr. 27, 2021 from Chinese Application No. 201580083986.6, 19 pages.

* cited by examiner

US 11,061,687 B2

APPARATUS AND METHOD FOR PROGRAM GENERATION

CROSS-REFERENCE TO RELATED APPLICATION

This application is a continuation application of International Application PCT/JP2015/079759 filed on Oct. 22, 2015 which designated the U.S., the entire contents of which are incorporated herein by reference.

FIELD

The embodiments discussed herein are related to an apparatus and method for program generation.

BACKGROUND

Image processing for determining to which class an object in an image belongs is called image classification. Among image classification techniques, image processing for making classification into two classes is the most common use and, for example, facial image recognition where classification is made into two classes of "face" and "non-face" is widely used.

As for generation of an image processing program, on the other hand, there is a proposed technique for using genetic programming to automatically generate an image processing program that executes desired image processing. According to the technique, an image processing program generated by combining partial programs for image processing (for example, image filtering programs) is optimized by genetic programming, using input images and targeted processing results (e.g. target images).

Another proposed technique is directed to employing genetic programming also in generation of an image classification program. According to the technique, a filter bank provided at a stage prior to a feature value group calculating unit for calculating a feature value group to be input to a classifier is optimized by evolutionary computation.

See, for example, the following documents:

Japanese Laid-open Patent Publication No. 2007-213480; and

Shinya Aoki and Tomoharu Nagao, "ACTIT: Automatic Construction of Tree-structural Image Transformations", Journal of the Institute of Image Information and Television Engineers, vol. 53, no. 6, Jun. 20, 1999, pp. 888-894.

In image classification, the following two aspects are important to increase the classification accuracy: what types of feature values are extracted from images and used; and what kind of classifier is to be generated based on the acquired feature values. However, searching for the optimal combination of these two aspects takes advanced knowledge and a significant amount of development time from experts.

In addition, the aforementioned technique for optimizing the filter bank by evolutionary computation does not include the generation of a classifier as a target of the optimization using evolutionary computation.

SUMMARY

According to an aspect, there is provided a program generating apparatus including a processor configured to perform a procedure which includes performing a generation process for generating a plurality of tree structures each representing an image classification program and having a first level group and a second level group each including one or more adjacent hierarchical levels, elements of nodes in the first level group being selected from amongst a plurality of image filters each used to apply preprocessing to an input image, an element of a node in the second level group being selected from amongst a plurality of setting programs each used to set a different value as a control parameter for generating a classifier based on information obtained by execution of the elements selected for the nodes in the first level group, and outputting, using genetic programming, a tree structure with a fitness score exceeding a predetermined threshold based on the plurality of tree structures.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
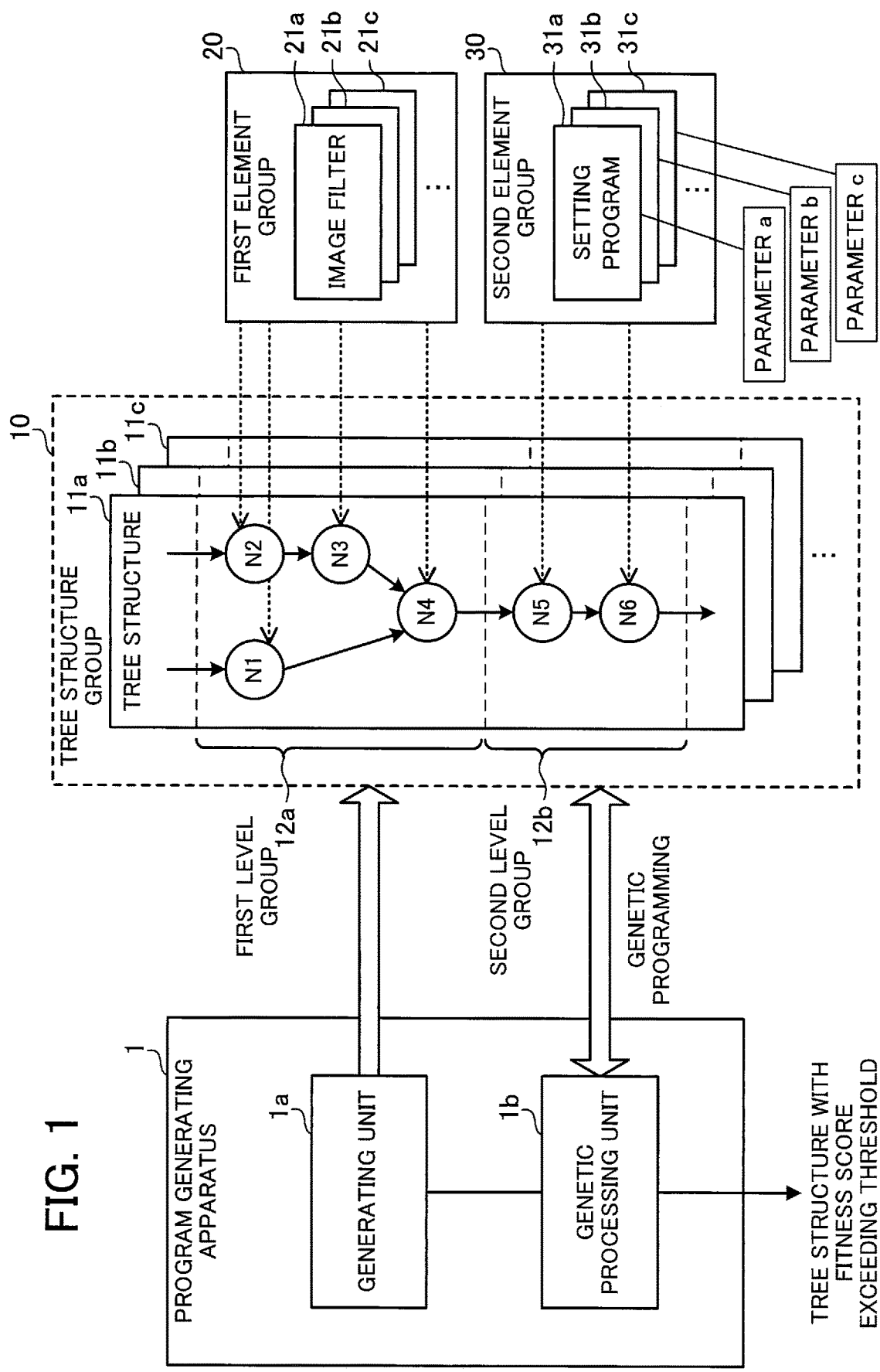
FIG. 1 illustrates a configuration and processing example of a program generating apparatus according to a first embodiment.

Several embodiments will be described below with reference to the accompanying drawings, wherein like reference numerals refer to like elements throughout.

(a) First Embodiment

FIG. 1 illustrates a configuration and processing example of a program generating apparatus according to a first embodiment. A program generating apparatus 1 of FIG. 1 includes a generating unit 1a and a genetic processing unit 1b. Processing carried out by the generating unit 1a and the genetic processing unit 1b is implemented, for example, by a processor of the program generating apparatus 1 executing a predetermined program.

The generating unit 1a generates a plurality of tree structures 11a, 11b, 11c, and so on each representing an image classification program. The image classification programs are used to determine to which class among a plurality of classes an input image belongs. Each of the tree structures 11a, 11b, 11c, and so on has a first level group 12a and a second level group 12b each including one or more adjacent hierarchical levels.

Elements of nodes in the first level group 12a are selected from amongst a plurality of image filters 21a, 21b, 21c, and so on included in a first element group 20. Each of the image filters 21a, 21b, 21c, and so on is a program used to apply preprocessing to an input image. In the example of FIG. 1, the first level group 12a of the tree structure 11a includes nodes N1 to N4, each element of which is selected from amongst the image filters 21a, 21b, 21c, and so on.

Elements of nodes in the second level group 12b are selected from amongst a plurality of setting programs 31a, 31b, 31c, and so on included in a second element group 30. Each of the setting programs 31a, 31b, 31c, and so on is a program used to set a different value as a control parameter for generating a classifier based on information obtained by execution of the elements selected for the nodes in the first level group 12a.

In the example of FIG. 1, the setting programs 31a, 31b, and 31c are programs for setting parameters a, b, and c, respectively, to generate a classifier. The second level group 12b of the tree structure 11a includes nodes N5 and N6, each element of which is selected from amongst the setting programs 31a, 31b, 31c, and so on.

The genetic processing unit 1b outputs, using genetic programming, a tree structure with a fitness score exceeding a predetermined threshold based on the tree structures 11a, 11b, 11c, and so on generated by the generating unit 1a. For example, the genetic processing unit 1b performs the following procedure, beginning with the tree structures 11a, 11b, 11c, and so on being included in a tree structure group 10. The genetic processing unit 1b generates a child tree structure based on a parent tree structure selected from the tree structure group 10. The genetic processing unit 1b then calculates a fitness score of the generated child tree structure based on a classification accuracy rate of a classifier generated by processing on the basis of the child tree structure. If the calculated fitness score is less than or equal to the above threshold, the genetic processing unit 1b replaces the child tree structure with one of the tree structures included in the tree structure group 10. The genetic processing unit 1b repeats this procedure until the fitness score of the child tree structure exceeds the above threshold.

According to the program generating apparatus 1 above, the elements assigned to the individual nodes in the first level group 12a and those in the second level group 12b are respectively optimized by genetic programming. Herewith, it is possible to find the optimal combination of preprocessing algorithms and classifier generating algorithms. This allows generation of an image classification program offering highly accurate image classification processing.

(b) Second Embodiment

Next described is an image processor according to a second embodiment. The image processor according to the second embodiment has the same processing functions as those of the program generating apparatus 1 of FIG. 1 as well as functions for running an image classification program generated by the processing functions to thereby perform image classification processing.

Figure 2:
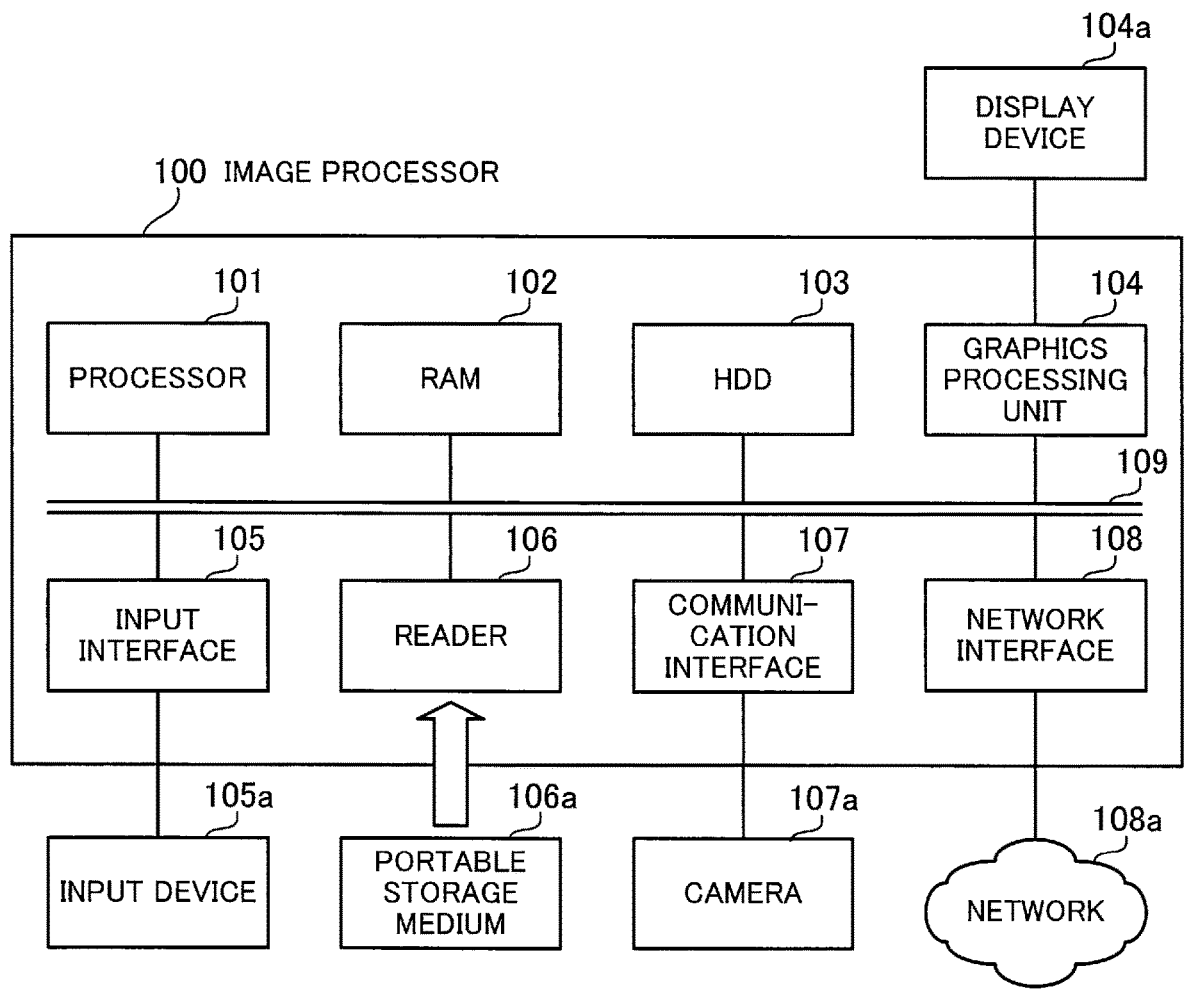
FIG. 2 illustrates an example of a hardware configuration of an image processor according to a second embodiment.

FIG. 2 illustrates an example of a hardware configuration of the image processor according to the second embodiment. An image processor 100 according to the second embodiment is implemented, for example, as a computer illustrated in FIG. 2. Overall control of the image processor 100 is exercised by a processor 101. The processor 101 may be a multi-processor. The processor 101 is, for example, a central processing unit (CPU), a micro processing unit (MPU), a digital signal processor (DSP), an application specific integrated circuit (ASIC), a programmable logic device (PLD), or a combination of two or more of these. To the processor 101, random access memory (RAM) 102 and a plurality of peripherals are connected via a bus 109.

The RAM 102 is used as a main storage device of the image processor 100. The RAM 102 temporarily stores at least part of an operating system (OS) program and application programs to be executed by the processor 101. The RAM 102 also stores therein various types of data to be used by the processor 101 for its processing.

The peripherals connected to the bus 109 include a hard disk drive (HDD) 103, a graphics processing unit 104, an input interface 105, a reader 106, a communication interface 107, and a network interface 108. The HDD 103 is used as a secondary storage device of the image processor 100. The HDD 103 stores therein the OS program, application programs, and various types of data. Note that a different type of non-volatile storage device, such as a solid state drive (SSD), may be used as a secondary storage device in place of the HDD 103. To the graphics processing unit 104, a display device 104a is connected. According to an instruction from the processor 101, the graphics processing unit 104 displays an image on the screen of the display device 104a. A liquid crystal display or an organic electroluminescence (EL) display, for example, may be used as the display device 104a.

To the input interface 105, an input device 105a is connected. The input interface 105 transmits signals output from the input device 105a to the processor 101. The input device 105a is, for example, a keyboard or a pointing device. Examples of the pointing device include a mouse, a touch panel, a tablet, a touch-pad, and a track ball. Into the reader 106, a portable storage medium 106a is loaded. The reader 106 reads data recorded on the portable storage medium 106a and transmits the read data to the processor 101. The portable storage medium 106a may be an optical disk, a magneto optical disk, or semiconductor memory, for example.

The communication interface 107 transmits and receives data to and from an external device connected thereto. In this embodiment, a camera 107a is connected to the communication interface 107 as its external device, and the communication interface 107 transmits, to the processor 101, image data sent from the camera 107a. The network interface 108 transmits and receives data to and from different devices via a network 108a. The hardware configuration described above achieves processing functions of the image processor 100.

Using genetic programming, the above image processor 100 automatically generates an image classification program for classifying an input image into one of a plurality of classes. Image classification processing based on the generated image classification program includes, for example, processing for determining whether a face is present in the input image and processing for determining whether a product or part in the input image is defective or not.

Processing implemented by the image classification program includes classifier generation processing for generating a classifier through learning using learning images and preprocessing for generating feature information to be input to the classifier based on the learning images. In order to produce highly accurate image classification, the following two aspects are both important: what types of feature values are extracted from the learning images and used; and what kind of classifier is to be generated based on the acquired feature values. Using genetic programming, the image processor 100 searches for the optimal combination of classifier generating algorithms and preprocessing algorithms. This allows generation of an image classification program for implementing processing of a classifier offering highly accurate image classification.

Figure 3:
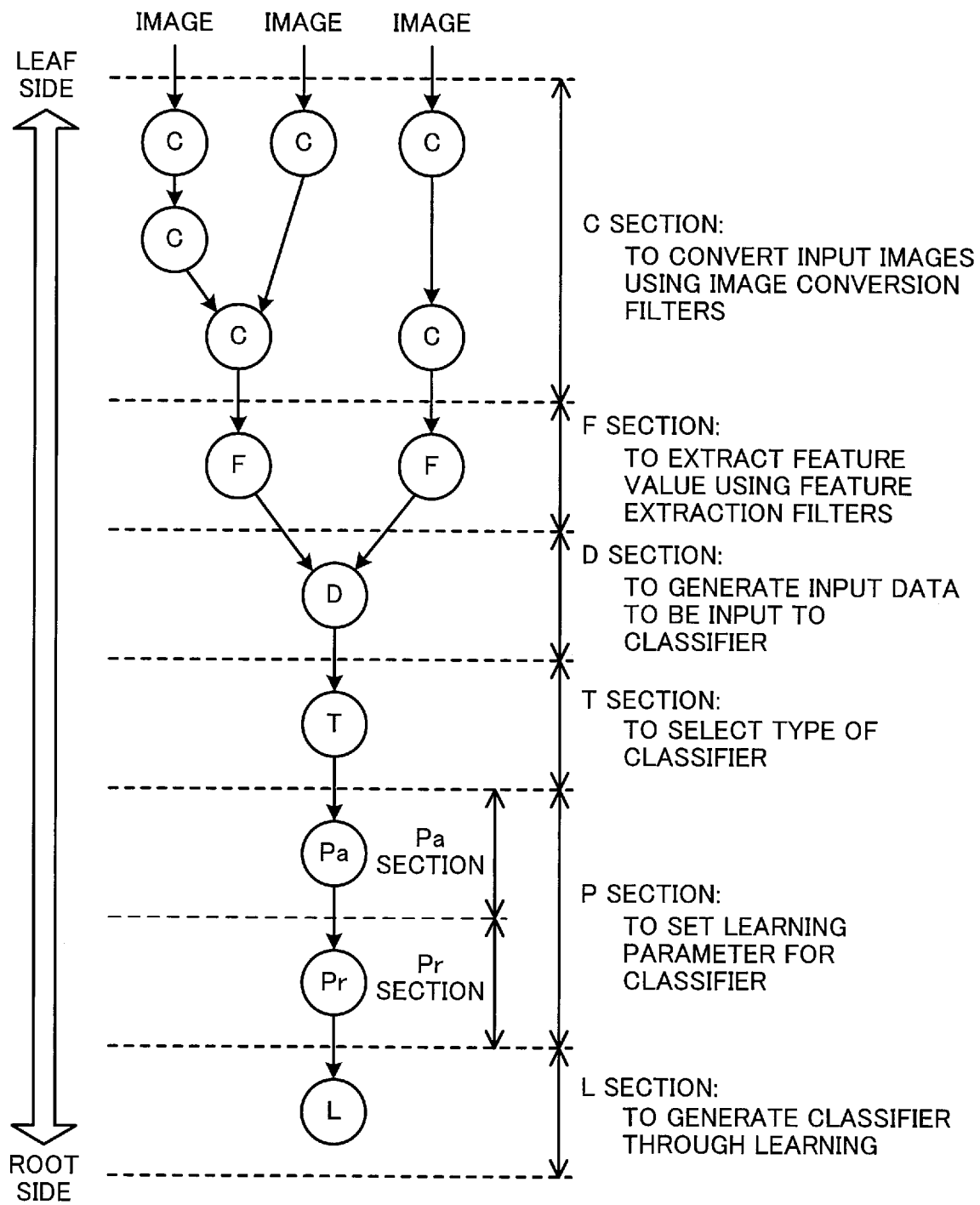
FIG. 3 illustrates a structural example of an individual.

FIG. 3 illustrates a structural example of an individual. Each individual handled in genetic programming is represented by a tree structure in which a program module is assigned to the element of each node, as depicted in FIG. 3. The tree structure representing an individual is split into sections each including one or more adjacent hierarchical levels. According to the second embodiment, the tree structure is split into a conversion (C) section; a feature (F) section; a data (D) section; a type (T) section; a parameter (P) section; and a learning (L) section, starting from the leaf side toward the root side, as illustrated in FIG. 3.

The sections correspond to respective processing stages of image classification, and processing at each stage is carried out based on elements included in the corresponding section. For example, the C, F, and D sections are associated with preprocessing for generating data to be input to a classifier. The C section corresponds to processing for converting an input image to be suitable for feature extraction with the use of image conversion filters. The F section corresponds to processing for extracting a feature value from the image converted in the processing of the C section with the use of feature extraction filters. The D section corresponds to processing for generating input data to be input to the classifier based on the feature value extracted in the processing of the F section.

The T section corresponds to processing for selecting a type of the classifier. The P section corresponds to processing for setting a learning parameter used to generate the classifier through learning using learning images. The P section is split into, for example, Pa and Pr sections. The Pa section corresponds to processing for setting an absolute value of the learning parameter while the Pr section corresponds to processing for setting a relative value of the learning parameter. The absolute value set in the Pa section is increased or decreased by addition or subtraction, or scaling, using the relative value set in the Pr section, to thereby determine the learning parameter used to generate the classifier. The L section corresponds to processing for generating the classifier through learning using the learning images.

Each section has a different number of nodes allowed to be set in the section as well as a different inter-node structure. For example, the C section includes, at the hierarchical level closest to the root side, as many nodes as the number of nodes provided at the hierarchical level closest to the leaf side in the F section. In addition, the number of node branches and the number of node rows provided from the root side to the leaf side in the C section are determined under a condition, such as the maximum number of hierarchical levels (node rows) from the root side to the leaf side of the C section being less than or equal to a given number, for example.

The F section includes, at the hierarchical level closest to the root side, as many nodes as the number of data pieces allowed to enter program modules set in the D section. In addition, the F section includes, for example, up to a certain number of nodes connected from its root-side nodes toward the leaf side.

As for the D section, a limit is set on the number of hierarchical levels. Assume, for example, that a program module with two inputs is assigned as each element of the D section and the number of hierarchical levels in the D section is limited to 2 or less. In this case, if the D section has one hierarchical level, the number of nodes in the D section is 1 and the number of data inputs into the D section is 2. On the other hand, if the D section has two hierarchical levels, the number of nodes in the D section is 3 and the number of data inputs into the D section is up to 4.

In each of the T, Pa, Pr, and L sections, a single node is provided. Note however that two or more nodes connected in series may be provided, for example, in the Pa and Pr sections.

Figure 4:
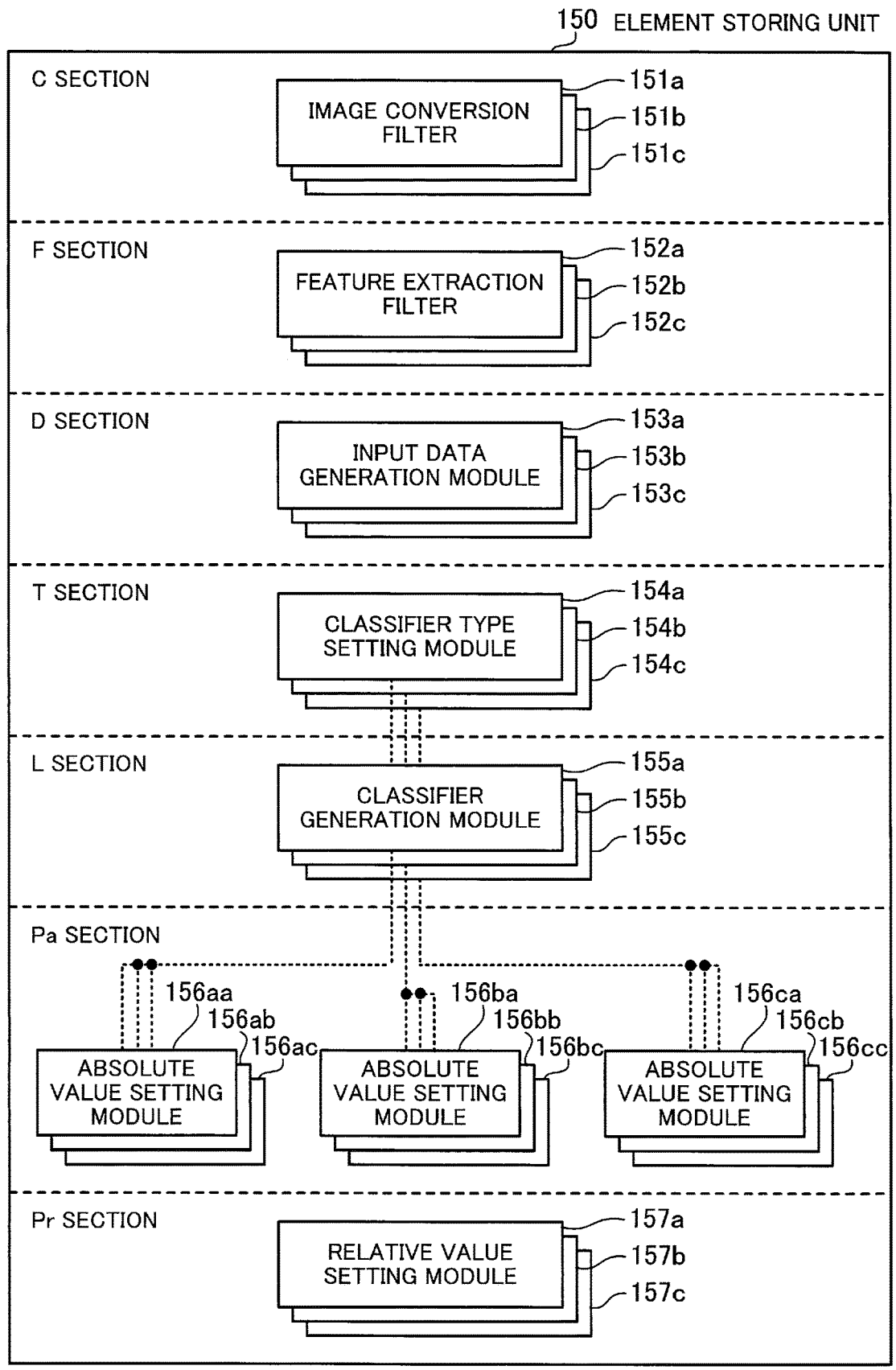
FIG. 4 illustrates an example of elements of respective sections.

FIG. 4 illustrates an example of elements of respective sections. Note that, in FIG. 4, the sections are depicted in a different order from that in FIG. 3 for convenience of illustration. Program modules assignable as elements to nodes are prepared separately for each section and stored in advance in an element storing unit 150. In setting an initial individual tree structure, elements included in each section are respectively selected from program modules corresponding to the section.

In the element storing unit 150, image conversion filters 151a, 151b, 151c, and so on each for converting an input image are stored as program modules corresponding to the C section, as illustrated in FIG. 4. Examples applicable to the image conversion filters 151a, 151b, 151c, and so on include a Smooth filter; a Sobel filter; a Laplace filter; an And filter; a Sub filter; an Add filter; an Or filter; an Erode filter; a Dilate filter; and a Threshold filter.

In addition, feature extraction filters 152a, 152b, 152c, and so on each for extracting a feature value are stored in the element storing unit 150 as program modules corresponding to the F section. Examples applicable to the feature extraction filters 152a, 152b, 152c, and so on include a filter for calculating an average luminance; a filter for calculating a luminance histogram; and a filter for performing Fast Fourier Transformation (FFT). In addition, filters of the same kind each having a different control parameter (e.g. a region division number) are also applicable.

Further, input data generation modules 153a, 153b, 153c, and so on each for generating data to be input (hereinafter referred to as "input data") to the classifier are stored in the element storing unit 150 as program modules corresponding to the D section. Examples applicable to the input data generation modules 153a, 153b, 153c, and so on include program modules each with one or two inputs; and program modules each, for example, for normalizing the input data and for compressing the input data. Note here that the number of hierarchical levels in the D section is variable, as described above. The number of hierarchical levels in the D section and the number of inputs of program modules assigned to the elements of the D section being variable enables learning with a varying number of feature dimensions.

Still further, classifier type setting modules 154a, 154b, 154c, and so on each for designating a type of the classifier are stored in the element storing unit 150 as program modules corresponding to the T section. Yet further, classifier generation modules 155a, 155b, 155c, and so on each for generating the classifier are stored in the element storing unit 150 as program modules corresponding to the L section. There is dependency for assignable program modules between the T section and the L section. Specifically, the classifier type setting modules 154a, 154b, 154c, and so on correspond one-to-one with the classifier generation modules 155a, 155b, 155c, and so on. If an element in one of the T and L sections is determined, an element in the other section is then uniquely determined. For example, if the classifier type setting module 154a is determined as an element in the T section, the classifier generation module 155a is then determined as an element in the L section.

In addition, between the T and L sections and the Pa section, there is dependency for assignable program modules. A plurality of absolute value setting modules corresponding to each of the classifier type setting modules (or each of the classifier generation modules) are stored in the element storing unit 150 as program modules assignable to the Pa section. For example, the element storing unit 150 stores absolute value setting modules 156aa, 156ab, 156ac, and so on corresponding to the classifier type setting module 154a; absolute value setting modules 156ba, 156bb, 156bc, and so on corresponding to the classifier type setting module 154b; and absolute value setting modules 156ca, 156cb, 156cc, and so on corresponding to the classifier type setting module 154c. Then if, for example, a classifier type setting module is determined as the element of the T section, one of the absolute value setting modules corresponding to the determined classifier type setting module is set as the element of the Pa section.

Yet further, relative value setting modules 157a, 157b, 157c, and so on each for making fine-tuning by increasing/decreasing the absolute value of the learning parameter are stored in the element storing unit 150 as program modules corresponding to the Pr section.

The above-described program modules stored in the element storing unit 150 are assigned to the nodes in the tree structure of FIG. 3, to thereby generate an individual. The image processor 100 first generates a plurality of initial individuals to be included in an individual group, then generates a child individual based on a parent individual selected from the individual group, and replaces one parent individual included in the individual group with a child individual with a high fitness score. The image processor 100 repeats such procedure and outputs an individual achieving or exceeding a certain fitness score as the best individual.

In the above-described procedure, to evolve a parent individual to generate a child individual, the element at one or more nodes of the parent individual is changed. In the case of changing the element at a node to evolve the parent individual, an element to be newly assigned is a program module prepared in advance for the section to which the node belongs. For example, in the case of changing an element in the C section by mutation, an element to be newly assigned is selected from amongst the image conversion filters corresponding to the C section.

According to the above-described procedure, a combination of processing algorithms in the respective sections is optimized. For example, a combination of processing algorithms for extracting a feature value to be input to the classifier and processing algorithms for generating the classifier is optimized. This allows not only selection of a type of classifier and a learning parameter suitable for image classification but also extraction of a feature value suitable to be input to the classifier. As a result, it is possible to generate an image classification program with high classification accuracy.

An additional explanation is given next of the absolute value setting modules and relative value setting modules. The P section is split into the Pa section for setting an absolute value of a learning parameter and the Pr section for setting a relative value of the learning parameter. An element of the Pa section is selected from amongst the absolute value setting modules corresponding to a program module assigned to the T or L section. On the other hand, the relative value setting modules each assignable as the element of the Pr section are program modules each for adding or subtracting a different value to or from the absolute value of the learning parameter, set by the element of the Pa section. Alternatively, the relative value setting modules may be program modules each for scaling the absolute value of the learning parameter by multiplication using a different coefficient.

According to the arrangement described above, for example, the element of the Pa section loosely sets the learning parameter, and the element of the Pr section then fine-tunes the leaning parameter. Depending on the type of classifier, the learning parameter may have a different numerical range. Therefore, as for the elements assignable to the Pa section, only elements for setting numerical values across a settable range for the type of classifier assigned in the T section need to be prepared. This eliminates the need to prepare a large number of program modules for setting the learning parameter so as to finely cover the entire range of numerical values settable for all the types of classifiers, thus reducing the number of program modules. This also improves learning efficiency in the genetic programming.

In the case where, for example, support vector machines (SVMs) are employed as classifiers, the following may be applied as the elements assignable to the T and P sections. That is, program modules each for designating a kernel function to be used may be applied as the classifier type setting modules 154a, 154b, 154c, and so on corresponding to the T section. Examples of the kernel function to be used include linear kernel, polynomial kernel, radial basis function (RBF) kernel, and sigmoid kernel.

In addition, program modules for setting values of C and γ as learning parameters may be applied as the absolute value setting modules corresponding to the Pa and Pr sections. Program modules each for generating the classifier using a kernel function designated by the element of the T section may be applied as the classifier generation modules 155a, 155b, 155c, and so on corresponding to the L section. In addition, in the T section, the classifier type may be selected from amongst a plurality of types of classifiers other than SVMs, or from amongst SVM classifiers and other types of classifiers.

Figure 5:
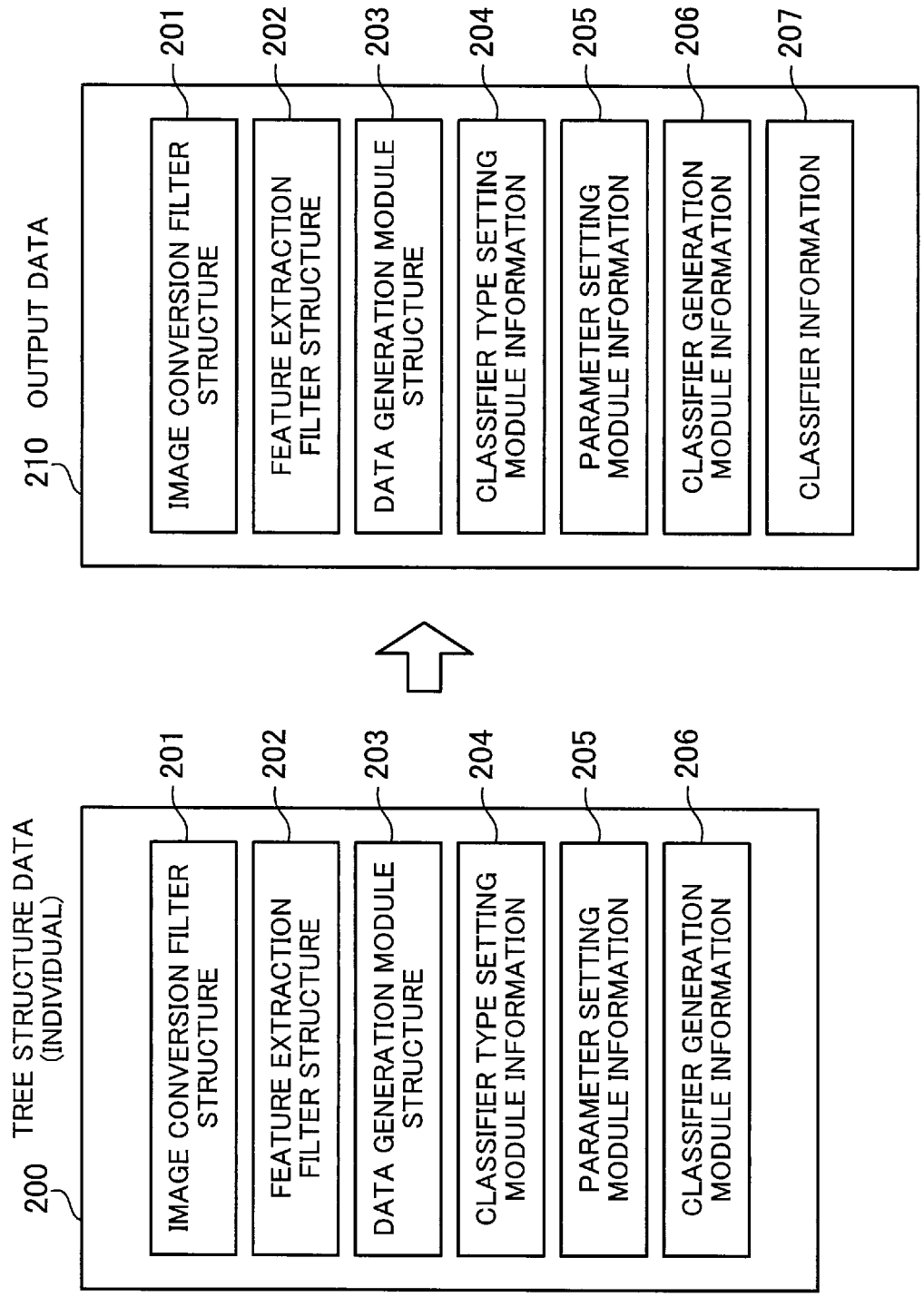
FIG. 5 illustrates a data structural example of the individual and output data.

FIG. 5 illustrates a data structural example of an individual and output data. An individual is represented, for example, as tree structure data 200 indicating details of a tree structure. The tree structure data 200 includes an image conversion filter structure 201, a feature extraction filter structure 202, a data generation module structure 203, classifier type setting module information 204, parameter setting module information 205, and classifier generation module information 206.

The image conversion filter structure 201 includes information indicating a node configuration of the C section and identification information of image conversion filters assigned to the respective nodes in the C section. The feature extraction filter structure 202 includes information indicating a node configuration of the F section and identification information of feature extraction filters assigned to the respective nodes in the F section. The data generation module structure 203 includes information indicating a node configuration of the D section and identification information of input data generation modules assigned to the respective nodes in the D section.

The classifier type setting module information 204 includes identification information of a classifier type setting module assigned to the node of the T section. The parameter setting module information 205 includes identification information of an absolute value setting module assigned to the node of the Pa section and identification information of a relative value setting module assigned to the node of the Pr section. The classifier generation module information 206 includes identification information of a classifier generation module assigned to the node of the L section.

On the other hand, the output data 210 is information pertaining to an individual finally output by genetic programming. The output data 210 includes the image conversion filter structure 201, the feature extraction filter structure 202, the data generation module structure 203, the classifier type setting module information 204, the parameter setting module information 205, and the classifier generation module information 206 all associated with the individual, as well as classifier information 207. The classifier information 207 includes information indicating a classifier generated through learning using learning images. The classifier information 207 is, for example, a program module for implementing processing of the classifier.

Note that the output data 210 may be output in the form of a program generated by combining program modules extracted from the element storing unit 150 based on the image conversion filter structure 201, the feature extraction filter structure 202, and the data generation module structure 203 and a program module based on the classifier information 207.

The classifier type setting module information 204 and the parameter setting module information 205 may be omitted from the output data 210. Note however that the classifier type setting module information 204 and the parameter setting module information 205 being included in the output data 210 allows relearning of the classifier with new learning images using the output data 210.

Figure 6:
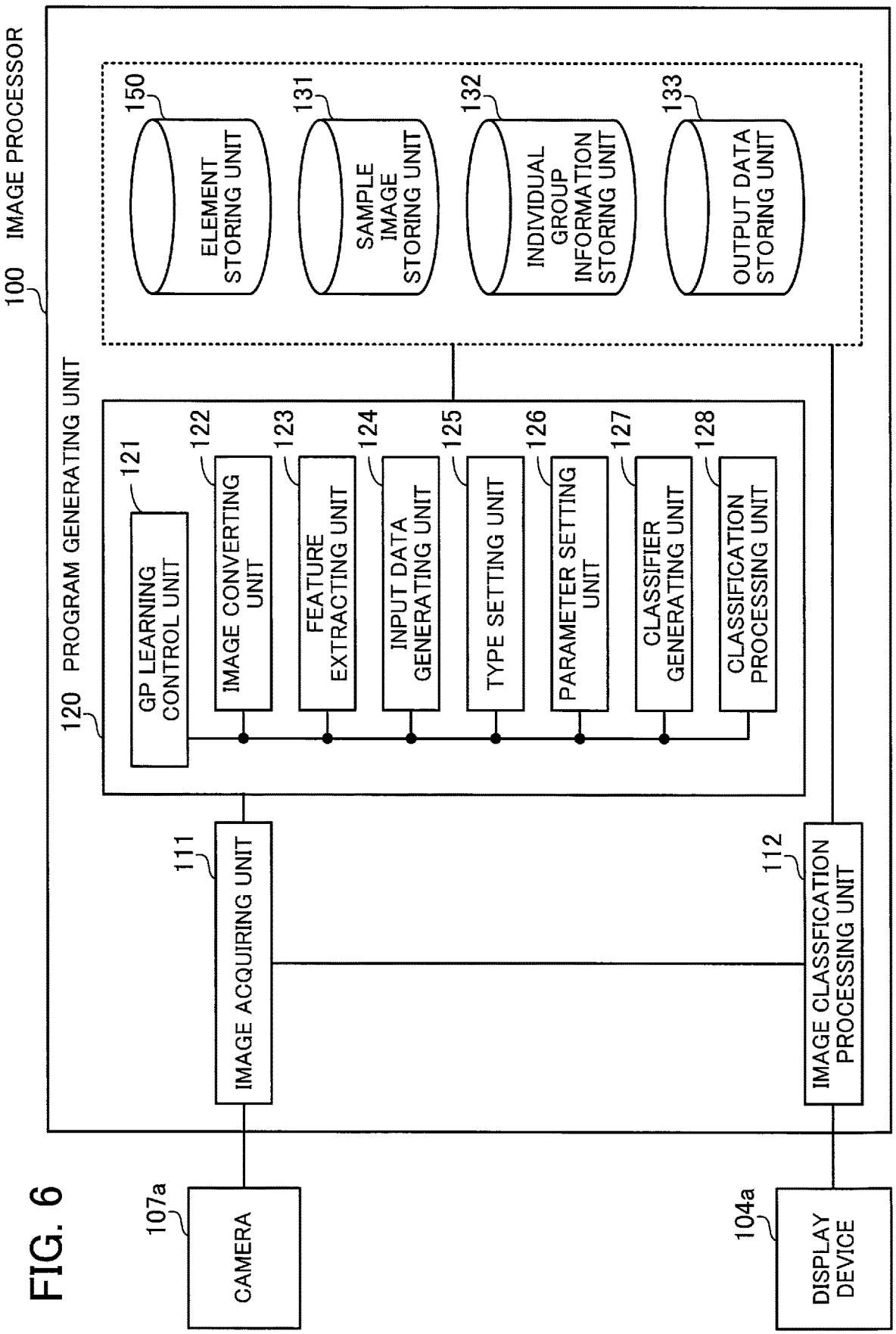
FIG. 6 is a block diagram illustrating a configuration example of processing functions of the image processor.

Next described are details of the image processor 100. FIG. 6 is a block diagram illustrating a configuration example of processing functions of the image processor. The image processor 100 includes an image acquiring unit 111, an image classification processing unit 112, a program generating unit 120, the element storing unit 150, a sample image storing unit 131, an individual group information storing unit 132, and an output data storing unit 133.

Processing of the image acquiring unit 111 and the program generating unit 120 is implemented, for example, by the processor 101 of the image processor 100 executing a predetermined program. In addition, part of processing of the image classification processing unit 112 is implemented by the processor 101 of the image processor 100 executing an image classification program based on output data stored in the output data storing unit 133. The element storing unit 150, the sample image storing unit 131, the individual group information storing unit 132, and the output data storing unit 133 are implemented using, for example, a storage area of the RAM 102 of the image processor 100.

The image acquiring unit 111 acquires data of a captured image from the camera 107a and outputs the acquired data to the program generating unit 120 or the image classification processing unit 112. The program generating unit 120 generates an image classification program by genetic programming, and stores, in the output data storing unit 133, output data corresponding to the generated image classification program. Note that the internal configuration of the program generating unit 120 is described later. The image classification processing unit 112 acquires the data of the image captured by the camera 107a via the image acquiring unit 111. The image classification processing unit 112 determines to which class the data of the captured image belongs according to the image classification program based on the output data stored in the output data storing unit 133. The determination result is displayed, for example, on the display device 104a.

The element storing unit 150 stores data of elements assignable to individuals generated by the program generating unit 120. The sample image storing unit 131 stores data of a plurality of sample images to be used for learning and evaluation of the classifier. To each sample image, a label indicating a class to which the sample image belongs is attached. Images acquired by the image acquiring unit 111 from the camera 107a are used as the sample images. The individual group information storing unit 132 stores data of an individual group generated by the program generating unit 120. Individuals included in the individual group are continually updated in the program generation processing. The output data storing unit 133 stores information pertaining to an individual finally output by processing of the program generating unit 120.

The program generating unit 120 includes a genetic programming (GP) learning control unit 121, an image converting unit 122, a feature extracting unit 123, an input data generating unit 124, a type setting unit 125, a parameter setting unit 126, a classifier generating unit 127, and a classification processing unit 128.

The GP learning control unit 121 controls the entire execution of the program generation processing using genetic programming. For example, the GP learning control unit 121 performs processing, such as generation of initial individuals, individual evolution processing, and fitness score calculation.

The image converting unit 122 performs image conversion processing on an input image according to image conversion filters assigned to the nodes in the C section of an individual tree structure.

The feature extracting unit 123 performs feature value extraction processing to extract a feature value from the input image having undergone the image conversion according to feature extraction filters assigned to the nodes in the F section of the individual tree structure.

The input data generating unit 124 generates input data to be input to the classifier based on the feature value input thereto according to input data generation modules assigned to the nodes in the D section of the individual tree structure.

The type setting unit 125 performs processing for setting a type of the classifier according to a classifier type setting module assigned to the node in the T section of the individual tree structure.

The parameter setting unit 126 performs processing for setting a learning parameter of the classifier according to an absolute value setting module assigned to the node in the Pa section and a relative value setting module assigned to the node in the Pr section of the individual tree structure.

The classifier generating unit 127 performs processing for generating the classifier through learning using the control parameter set by the parameter setting unit 126 according to a classifier generation module assigned to the node in the L section of the individual tree structure.

The classification processing unit 128 determines, using the classifier generated by the classifier generating unit 127, to which class an evaluation image belongs.

Figure 7:
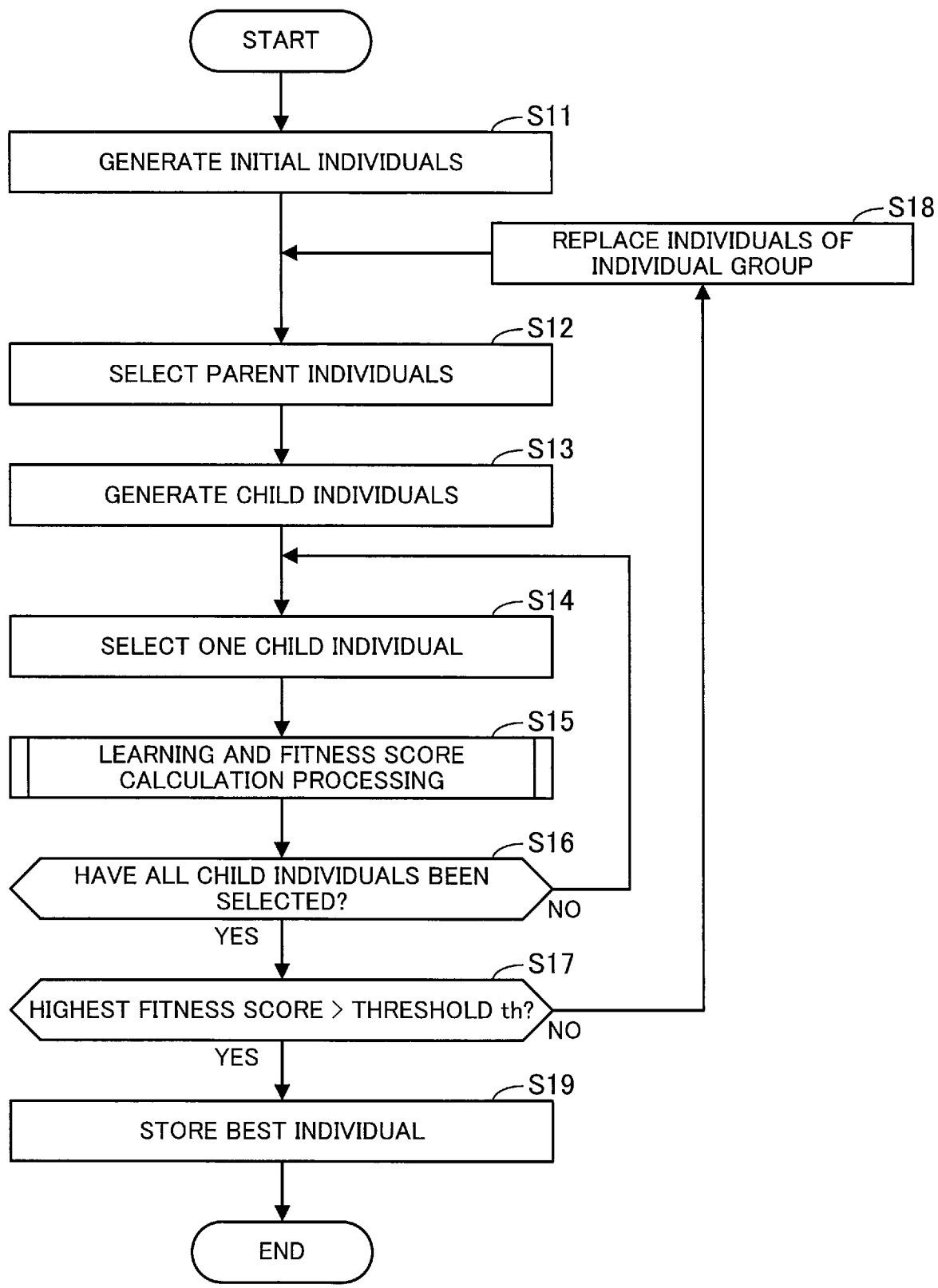
FIG. 7 is a flowchart illustrating an example of program generation procedure.

Next described is processing of the image processor 100 with reference to flowcharts. FIG. 7 is a flowchart illustrating an example of program generation procedure.

[Step S11] The GP learning control unit 121 generates a plurality of initial individuals and stores information indicating the generated initial individuals in the individual group information storing unit 132. Hereinafter, the individuals stored in the individual group information storing unit 132 are referred to as "individual group".

As for basic procedure for generating the initial individuals, the nodes are set in the respective sections according to such conditions explained in FIG. 3, and an element for each node is selected from amongst program modules corresponding to a section to which the node belongs and assigned to the node. In the case of using the elements depicted in FIG. 4, the initial individuals are set, for example, in the following procedure.

The GP learning control unit 121 selects an element to be assigned to the single node included in each of the L, Pr, Pa, and T sections. Specifically, the GP learning control unit 121 randomly selects the element to be assigned to the node in each of the sections from amongst the prepared program modules associated with the section. Note however that a classifier generation module to be assigned to the node in the L section is uniquely determined by a classifier type setting module assigned to the node in the T section. In addition, the element to be assigned to the node in the Pa section is randomly selected from amongst the absolute value setting modules corresponding to the classifier type setting module assigned to the node in the T section.

Note that nodes in a plurality of hierarchical levels may be set in the Pa section. In this case, it is preferable that absolute value setting modules be separately prepared for each node and a different type of control parameter be assigned to each node. Alternatively, the same number of node hierarchical levels may be provided in the Pa and Pr sections so as to fine-tune, for each node of the Pa section, the control parameter in the Pr section.

Next, in the case where the maximum number of hierarchical levels of the D section is 2, the GP learning control unit 121 randomly determines whether to provide one or two hierarchical levels in the D section. If the number of hierarchical levels is 1, the number of nodes in the D section is 1. The GP learning control unit 121 randomly selects an element to be assigned to the node from amongst the input data generation modules. On the other hand, if the number of hierarchical levels is 2, the number of nodes in the D section is two or more. The GP learning control unit 121 randomly selects, from amongst the input data generation modules, an element to be assigned to the node at the hierarchical level closest to the root side within the D section. If the number of inputs of the selected input generation module is 1, one node is set on its leaf side. On the other hand, if the number of inputs of the selected input generation module is 2, two nodes are set on its leaf side. The GP learning control unit 121 randomly selects, from amongst the input data generation modules, an element to be assigned to each of the set nodes. According to the above-described procedure, the number of inputs to the D section is one of 1 to 4.

Then, the GP learning control unit 121 assigns elements of the F section. The number of nodes in the F section is the same as the number of inputs to the D section. The GP learning control unit 121 randomly selects, from amongst the feature extraction filters, an element to be assigned to each node in the F section.

Subsequently, the GP learning control unit 121 assigns elements of the C section. The number of nodes at the hierarchical level closest to the root side within the C section is the same as the number of nodes in the F section. The GP learning control unit 121 provides nodes on the leaf side of the respective root-side nodes in the C section and randomly selects an element to be assigned to each of the nodes from amongst the image conversion filters. If the number of inputs of an image conversion filter assigned to a node is 2, two nodes are provided on the leaf side of the node. The GP learning control unit 121 assigns randomly selected image conversion filters to nodes on the leaf side of nodes to which elements have already been assigned, and also determines the number of nodes to be provided on their leaf side. In this manner, the GP learning control unit 121 determines the node structure, for example, in such a manner that the maximum number of hierarchical levels of the C section, starting from the root-side level, is less than or equal to a predetermined value and the number of nodes included in the C section is less than or equal to a predetermined value, and also determines elements of the respective nodes.

[Step S12] The GP learning control unit 121 randomly selects two parent individuals from the individuals included in the individual group.

[Step S13] The GP learning control unit 121 generates a predetermined number of, two or more, child individuals using the selected parent individuals. For example, the GP learning control unit 121 performs a crossover operation on the selected two parent individuals to thereby generate a predetermined number of, two or more child individuals. The GP learning control unit 121 introduces a mutation into a node of each of the generated child individuals to thereby replace the element of the node. Note that methods for crossover and mutation introduction are described in detail later with reference to FIGS. 8 and 9, respectively.

[Step S14] The GP learning control unit 121 selects one of the generated child individuals.

[Step S15] Based on the selected child individual, the GP learning control unit 121 performs generation of a classifier through learning and calculation of a fitness score for the generated classifier. Specific processing examples of step S15 are described with reference to FIGS. 10 to 14.

[Step S16] The GP learning control unit 121 determines whether all the child individuals generated in step S13 have been selected. If there are one or more unselected child individuals, the GP learning control unit 121 moves to step S14 and then selects one unselected child individual. On the other hand, if all the child individuals have been selected, the GP learning control unit 121 moves to step S17.

[Step S17] The GP learning control unit 121 determines whether the highest fitness score amongst the fitness scores calculated for the respective child individuals in step S15 is greater than a predetermined threshold th. If the highest fitness score is less than or equal to the threshold th, the GP learning control unit 121 moves to step S18. On the other hand, if the highest fitness score is greater than the threshold th, the GP learning control unit 121 moves to step S19.

[Step S18] The GP learning control unit 121 selects, from amongst the child individuals generated in step S13, the child individual with the highest fitness score as a child individual to be kept for the next generation. Further, the GP learning control unit 121 selects, from amongst the remaining child individuals, one more individual to be kept for the next generation. This selection of a child individual is made, for example, with a probability according to its fitness score. The GP learning control unit 121 replaces, amongst the individuals included in the individual group, the two parent individuals selected in step S12 with the two individuals selected to be kept for the next generation.

[Step S19] The GP learning control unit 121 determines, amongst the child individuals generated in step S13, a child individual with the highest fitness score as the best individual, and stores output data of the best individual in the output data storing unit 133. The output data includes classifier information indicating the classifier generated in step S15 in association with the best individual.

Note that, in step S14, the selection targets are only the child individuals; however, the parent individuals selected in step S12 may also be included in the selection targets.

Figure 8:
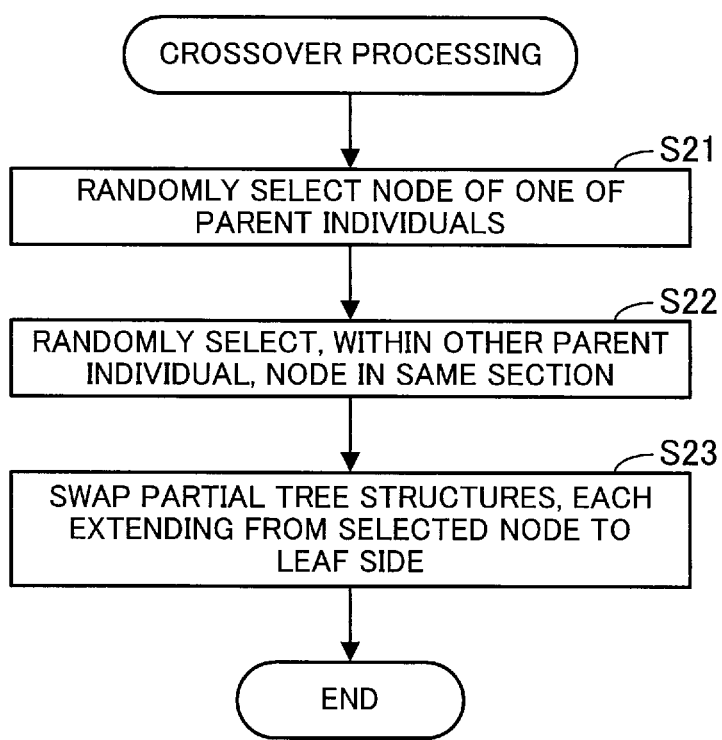
FIG. 8 is a flowchart illustrating an example of crossover procedure.

FIG. 8 is a flowchart illustrating an example of crossover procedure. The processing of FIG. 8 corresponds to a case where, in step S13 of FIG. 7, the two child individuals are generated from the two parent individuals by crossover.

[Step S21] The GP learning control unit 121 randomly selects a node of one of the two parent individuals ("first parent individual").

[Step S22] The GP learning control unit 121 selects, within the other one of the parent individuals ("second parent individual"), a node in the same section as that of the node selected in step S21. If the section includes a plurality of nodes, the GP learning control unit 121 randomly selects one node from amongst them.

[Step S23] The GP learning control unit 121 swaps a partial tree structure of the first parent individual, extending from the node selected in step S21 to the leaf side, with a partial tree structure of the second parent individual, extending from the node selected in step S22 to the leaf side. In this regard, if the nodes selected in steps S21 and S22 belong to the T, Pa, or L section, the GP learning control unit 121 also swaps, between the generated two child individuals, partial tree structures corresponding to the T, Pa, and L sections.

Figure 9:
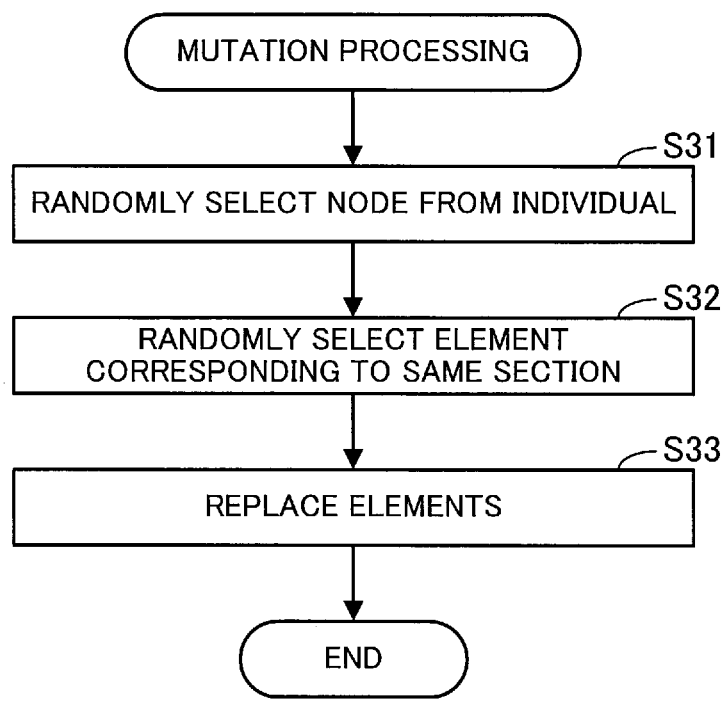
FIG. 9 is a flowchart illustrating an example of mutation procedure.

FIG. 9 is a flowchart illustrating an example of mutation procedure. The processing of FIG. 9 corresponds to a case where, in step S13 of FIG. 7, a mutation is introduced to a generated child individual.

[Step S31] The GP learning control unit 121 randomly selects a node from the child individual.

[Step S32] The GP learning control unit 121 identifies the section to which the node selected in step S31 belongs. Specifically, the GP learning control unit 121 randomly selects, from amongst elements stored in the element storing unit 150 and corresponding to the identified section, an element other than an element currently assigned to the node selected in step S31.

[Step S33] The GP learning control unit 121 replaces the element assigned to the node selected in step S31 with the element selected in step S32.

Note that, if the node selected in step S31 belongs to one of the T, Pa, and L sections, the GP learning control unit 121 also replaces, in steps S32 and S33, elements other than the node selected in step S31. Specifically, the GP learning control unit 121 first replaces an element of the node in the T section by the same procedure as in steps S32 and S33, and then replaces elements of the nodes in the Pa and L sections. An element to be assigned to the node in the Pa section is selected from amongst elements corresponding to the element newly selected for the node in the T section. An element to be assigned to the node in the L section is one corresponding to the element newly selected for the node in the T section.

Figure 10:
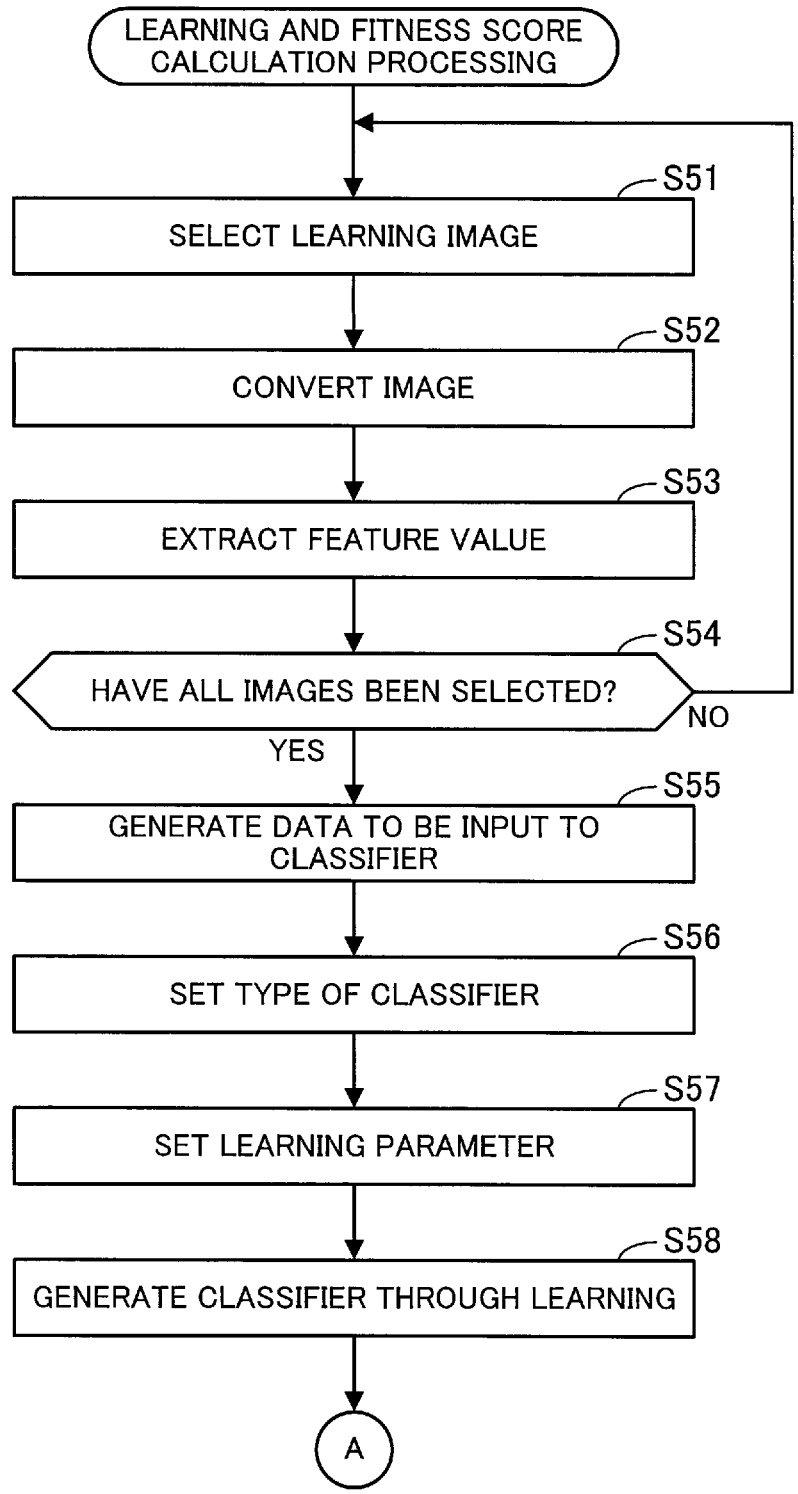
FIG. 10 is a first flowchart illustrating an example of learning and fitness score calculation procedure.
Figure 11:
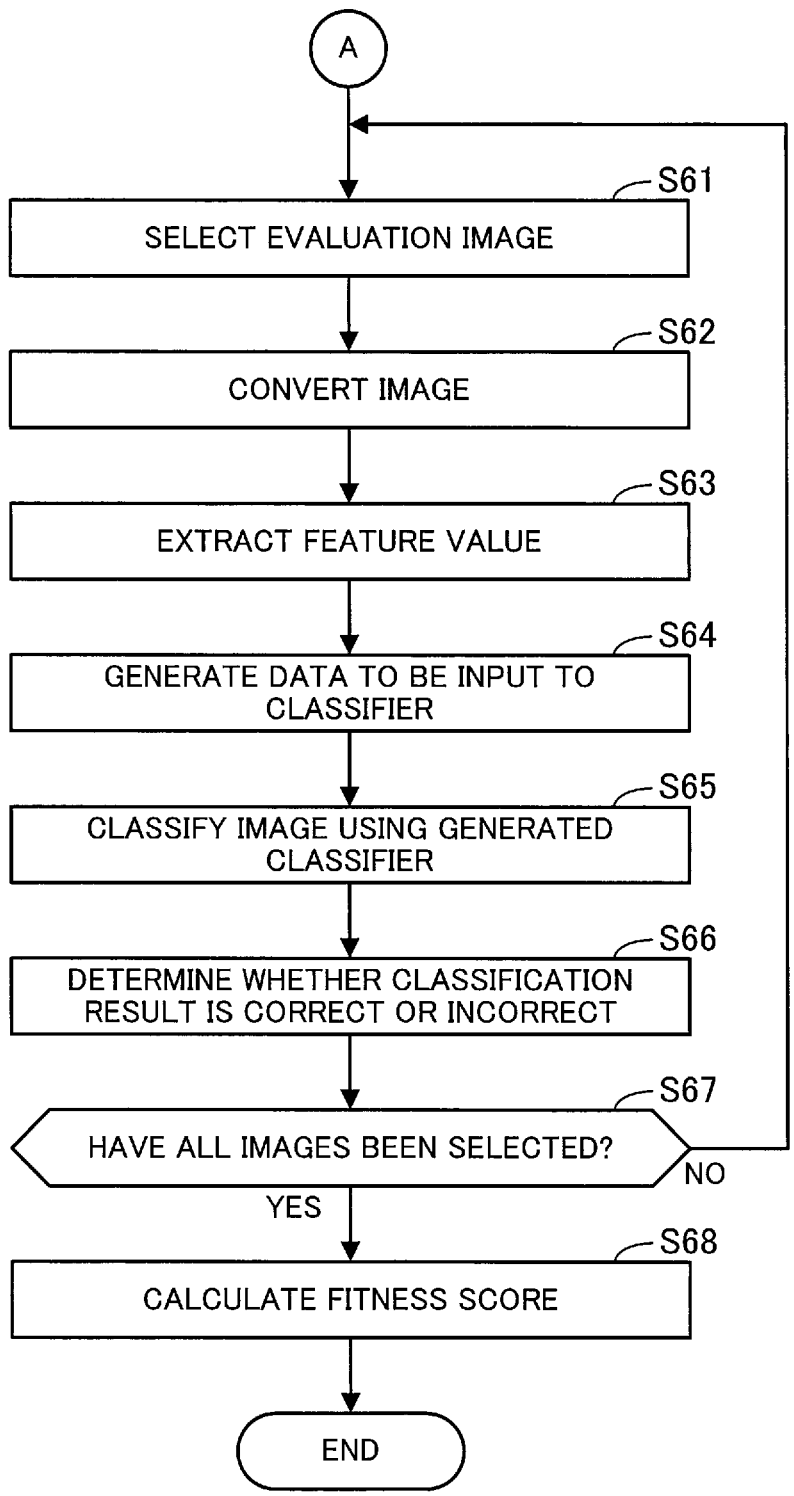
FIG. 11 is a second flowchart illustrating the example of the learning and fitness score calculation procedure.

FIGS. 10 and 11 are flowcharts illustrating an example of learning and fitness score calculation procedure. The processing of FIGS. 10 and 11 corresponds to step S15 of FIG. 7. A child individual used in the processing of FIGS. 10 and 11 is the one selected in step S14 of FIG. 7. Assume in FIGS. 10 and 11 that, for example, data of a plurality of learning images and data of a plurality of evaluation images are stored in the sample image storing unit 131.

[Step S51] The GP learning control unit 121 selects one from amongst the learning images.

[Step S52] The image converting unit 122 performs image conversion processing on the learning image selected in step S51 according to image conversion filters assigned to the nodes in the C section of the child individual.

[Step S53] The feature extracting unit 123 extracts a feature value based on the image converted in step S52 according to feature extraction filters assigned to the nodes in the F section of the child individual.

[Step S54] The GP learning control unit 121 determines whether all the learning images have been selected. If there are one or more unselected learning images, the GP learning control unit 121 moves to step S51 and then selects one unselected learning image. On the other hand, if all the learning images have been selected, the GP learning control unit 121 moves to step S55.

[Step S55] The input data generating unit 124 generates input data to be input to a classifier, based on the feature values extracted in step S53 according to input data generation modules assigned to the nodes in the D section of the child individual.

[Step S56] The type setting unit 125 sets a type of the classifier according to a classifier type setting module assigned to the node in the T section of the child individual.

[Step S57] The parameter setting unit 126 sets a learning parameter to be set for the classifier according to an absolute value setting module assigned to the node of the Pa section of the child individual and a relative value setting module assigned to the node of its Pr section.

[Step S58] The classifier generating unit 127 performs learning processing for classifier generation according to a classifier generation module assigned to the node in the L section of the child individual. This learning processing uses the learning parameter set in step S57, the input data generated in step S55, and labels attached to the respective learning images. Through the learning processing, the classifier is generated. In practice, classifier information indicating the generated classifier is generated. The classifier information is, for example, a program module for implementing processing of a classifier, or a control parameter to be set in a program module, such as a function, for implementing processing of a classifier.

Next, step S61 of FIG. 11 is performed.

[Step S61] The GP learning control unit 121 selects one from amongst the evaluation images.

[Step S62] The image converting unit 122 performs image conversion processing on the evaluation image selected in step S61 according to the image conversion filters assigned to the nodes in the C section of the child individual.

[Step S63] The feature extracting unit 123 extracts a feature value based on the image converted in step S62 according to the feature extraction filters assigned to the nodes in the F section of the child individual.

[Step S64] The input data generating unit 124 generates input data to be input to the classifier, based on the feature value extracted in step S63 according to the input data generation modules assigned to the nodes in the D section of the child individual.

[Step S65] The classification processing unit 128 performs classification processing for determining to which class the evaluation image selected in step S61 belongs, based on the input data generated in step S64 according to the classifier information generated in step S58.

[Step S66] The classification processing unit 128 compares the classification result obtained by the classification processing in step S65 against a class indicated by the label attached to the evaluation image selected in step S61 to determine whether the classification result is correct or incorrect.

[Step S67] The GP learning control unit 121 determines whether all the evaluation images have been selected. If there are one or more unselected evaluation images, the GP learning control unit 121 moves to step S61 and then selects one unselected evaluation image. On the other hand, if all the evaluation images have been selected, the GP learning control unit 121 moves to step S68.

[Step S68] The GP learning control unit 121 calculates the accuracy rate (i.e., the rate of correct results) based on the determination results obtained in step S66. The GP learning control unit 121 calculates a fitness score of the child individual based on the calculated accuracy rate.

In step S68, a value obtained by correcting the calculated accuracy rate by penalty terms may be output as the fitness score. Applicable penalty terms here are, for example, the number of feature dimensions, the tree structure size (the number of nodes included in the tree structure, or the maximum number of node hierarchical levels), and the number of support vectors in the case of employing SVMs. For example, generally speaking over-training is more likely to occur as the complexity of the classifier increases compared to data obtained. In view of this, the GP learning control unit 121 calculates the fitness score by introducing a correction for the accuracy rate, for example, in such a manner as to make the accuracy rate lower as the number of feature dimensions is larger, the tree structure size is larger, and the number of support vectors is larger. Note that the number of feature dimensions is identifiable based on the input data generation modules assigned to the D section of the child individual. Correcting the accuracy rate by the penalty terms provides an accurate assessment of whether each learning result is good or bad, which enables generation of an image classification program with high classification accuracy.

Note that, also in the case where at least one of the number of feature dimensions, the tree structure size, and the number of support vectors is extremely small, over-training may occur which impairs the generalization capability. Therefore, the correction quantities by the penalty terms need not be monotonic functions.

As for the processing depicted in FIGS. 10 and 11 above, the learning images and the evaluation images are separately prepared. On the other hand, adopting a cross-validation scheme eliminates the need to separately prepare the learning images and the evaluation images, and allows learning and evaluation of each classifier using all sample images prepared in the sample image storing unit 131. Next described is a processing example adopting the cross-validation scheme, with reference to FIGS. 12 to 14.

Figure 12:
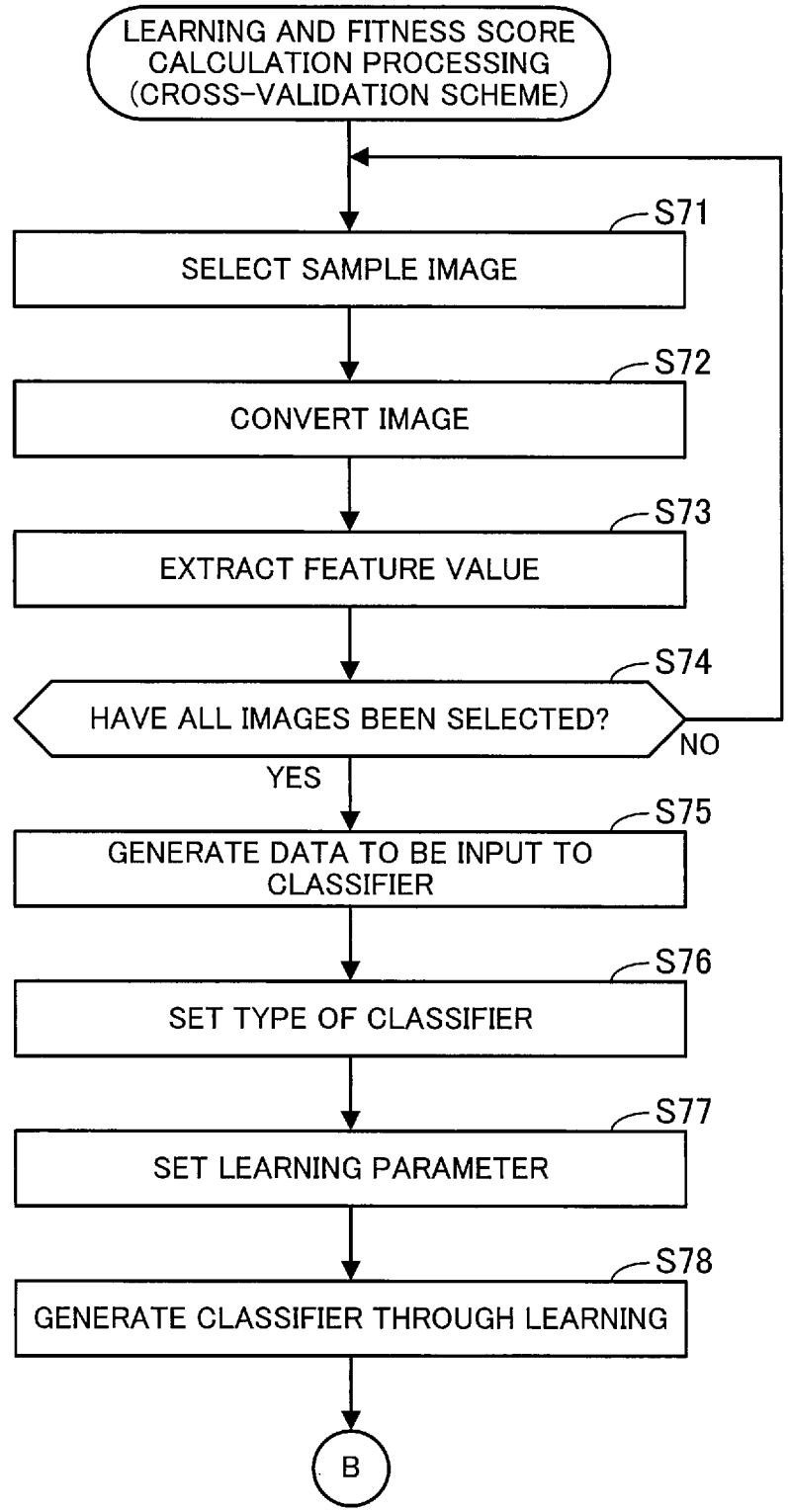
FIG. 12 is a first flowchart illustrating an example of the learning and fitness score calculation procedure in case of adopting a cross-validation scheme.
Figure 13:
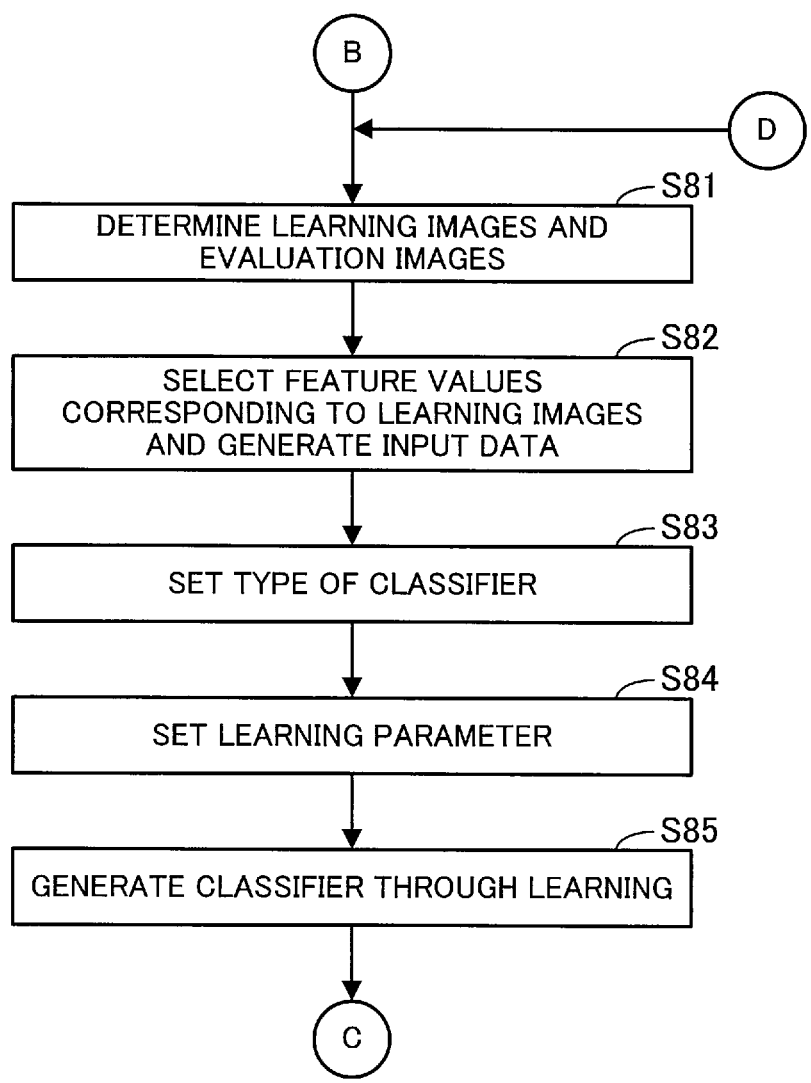
FIG. 13 is a second flowchart illustrating the example of the learning and fitness score calculation procedure in the case of adopting the cross-validation scheme.
Figure 14:
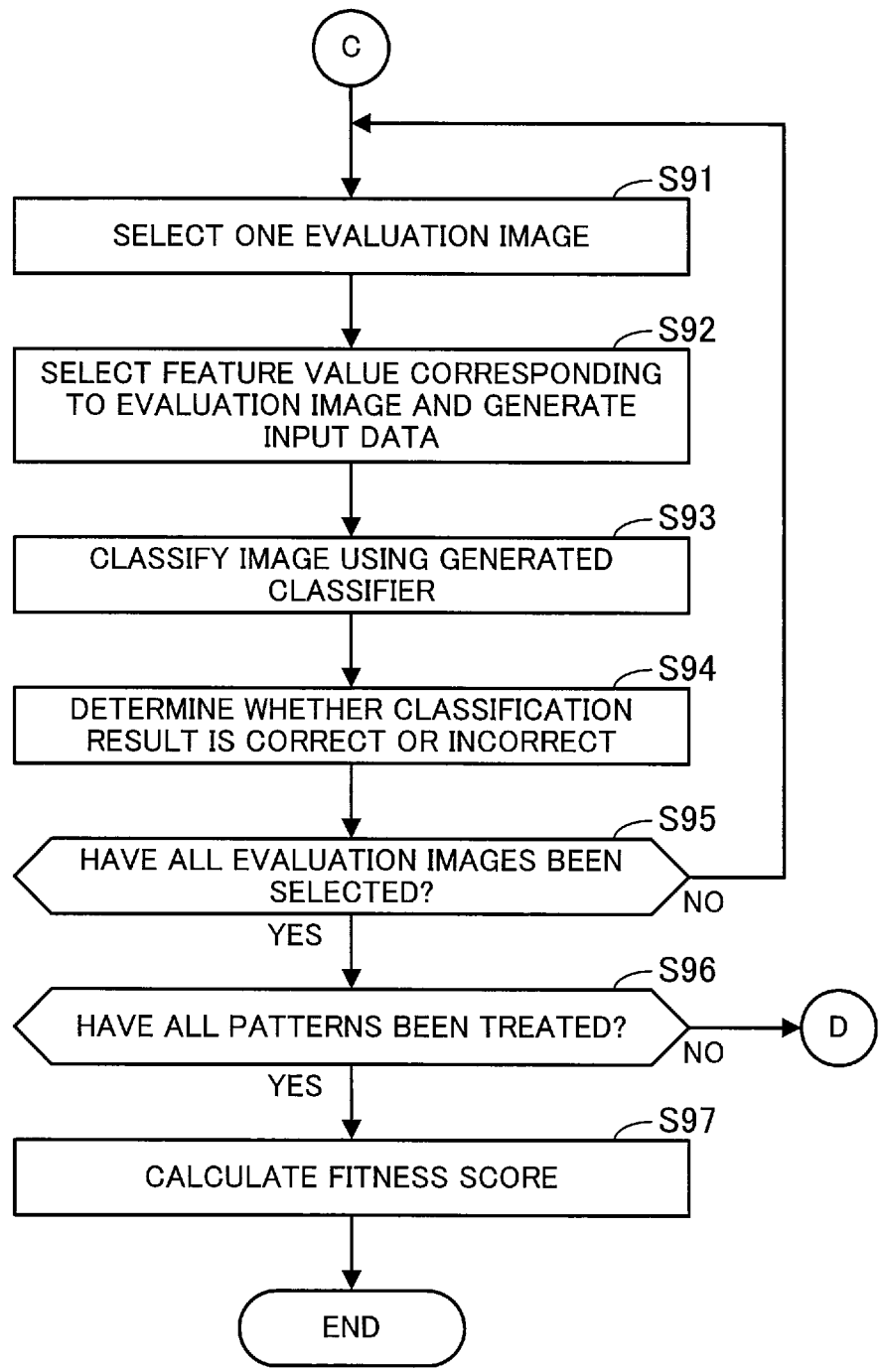
FIG. 14 is a third flowchart illustrating the example of the learning and fitness score calculation procedure in the case of adopting the cross-validation scheme.

FIGS. 12 to 14 are flowcharts illustrating an example of learning and fitness score calculation procedure in the case of adopting the cross-validation scheme. The processing of FIGS. 12 to 14 corresponds to step S15 of FIG. 7. A child individual used in the processing of FIGS. 12 to 14 is the one selected in step S14 of FIG. 7.

[Step S71] The GP learning control unit 121 selects one from amongst the sample images.

[Step S72] The image converting unit 122 performs image conversion processing on the sample image selected in step S71 according to image conversion filters assigned to the nodes in the C section of the child individual.

[Step S73] The feature extracting unit 123 extracts a feature value based on the image converted in step S72 according to feature extraction filters assigned to the nodes in the F section of the child individual.

[Step S74] The GP learning control unit 121 determines whether all the sample images have been selected. If there is one or more unselected sample images, the GP learning control unit 121 moves to step S71 and then selects one unselected sample image. On the other hand, if all the sample images have been selected, the GP learning control unit 121 moves to step S75.

[Step S75] The input data generating unit 124 generates input data to be input to a classifier, based on the feature value extracted in step S73 according to input data generation modules assigned to the nodes in the D section of the child individual.

[Step S76] The type setting unit 125 sets a type of the classifier according to a classifier type setting module assigned to the node in the T section of the child individual.

[Step S77] The parameter setting unit 126 sets a learning parameter to be set for the classifier according to an absolute value setting module assigned to the node of the Pa section of the child individual and a relative value setting module assigned to the node of its Pr section.

[Step S78] The classifier generating unit 127 performs learning processing for classifier generation according to a classifier generation module assigned to the node in the L section of the child individual. This learning processing uses the learning parameter set in step S77, the input data generated in step S75, and labels attached to the respective sample images. Through the learning processing, the classifier is generated.

Note that the classifier generated in step S78 is one to be included in the output data if the child individual is selected as the best individual in step S19 of FIG. 7. Therefore, instead of performing steps S75 to S78 at the above timing, these steps may be performed in step S19 when the child individual is selected as the best individual.

Next, step S81 of FIG. 13 is performed.

[Step S81] The GP learning control unit 121 splits the sample images into N groups each including an equal number of sample images. The GP learning control unit 121 determines the sample images belonging to (N−1) groups amongst the classified groups as learning images, and determines the sample images of the remaining one group as evaluation images.

[Step S82] The GP learning control unit 121 identifies, amongst the feature values extracted in step S73 of FIG. 12, feature values associated with the learning images determined in step S81 as processing targets. The input data generating unit 124 generates input data to be input to the classifier, based on the feature values identified as the processing targets according to input data generation modules assigned to the nodes in the D section of the child individual.

[Step S83] The type setting unit 125 sets a type of the classifier according to a classifier type setting module assigned to the node in the T section of the child individual.

[Step S84] The parameter setting unit 126 sets a learning parameter to be set for the classifier according to an absolute value setting module assigned to the node in the Pa section of the child individual and a relative value setting module assigned to the node in its Pr section.

[Step S85] The classifier generating unit 127 performs learning processing for classifier generation according to a classifier generation module assigned to the node in the L section of the child individual. This learning processing uses the learning parameter set in step S84, the input data generated in step S82, and labels attached to the respective learning images determined in step S81. Through the learning processing, the classifier is generated.

Next, step S91 of FIG. 14 is performed.

[Step S91] The GP learning control unit 121 selects one from amongst the evaluation images determined in step S81 of FIG. 13.

[Step S92] The GP learning control unit 121 selects, from amongst the feature values extracted in step S73 of FIG. 12, a feature value extracted from the evaluation image selected in step S91 as a processing target. The input data generating unit 124 generates input data to be input to the classifier, based on the feature value selected as the processing target according to input data generation modules assigned to the nodes in the D section of the child individual.

[Step S93] The classification processing unit 128 performs classification processing for determining to which class the evaluation image selected in step S91 belongs, based on the input data generated in step S92 using the classifier generated in step S85 of FIG. 13.

[Step S94] The classification processing unit 128 compares the classification result obtained by the classification processing in step S93 against a class indicated by the label attached to the evaluation image selected in step S91 to determine whether the classification result is correct or incorrect.

[Step S95] The GP learning control unit 121 determines whether all the evaluation images have been selected. If there are one or more unselected evaluation images, the GP learning control unit 121 moves to step S91 and then selects one unselected evaluation image. On the other hand, if all the evaluation images have been selected, the GP learning control unit 121 moves to step S96.

[Step S96] In step S81 of FIG. 13, N patterns are possible when the respective N groups are divided into the learning image group and the evaluation image group. The GP learning control unit 121 determines whether all these patterns have been treated. If there are one or more untreated patterns, the GP learning control unit 121 moves to step S81 and then newly identifies learning images and evaluation images according to an untreated pattern. On the other hand, if all the patterns have been treated, the GP learning control unit 121 moves to step S97.

[Step S97] The GP learning control unit 121 calculates the accuracy rate based on the determination results obtained in step S94. The GP learning control unit 121 calculates a fitness score of the child individual based on the calculated accuracy rate. In step S97, the GP learning control unit 121 may correct the calculated accuracy rate by penalty terms and then output the corrected value as the fitness score, following the same procedure as in step S68 of FIG. 11.

Compared with the processing of FIGS. 10 and 11, the processing depicted in FIGS. 12 to 14 above needs a small number of sample images to generate an image classification program with high classification accuracy.

Figure 15:
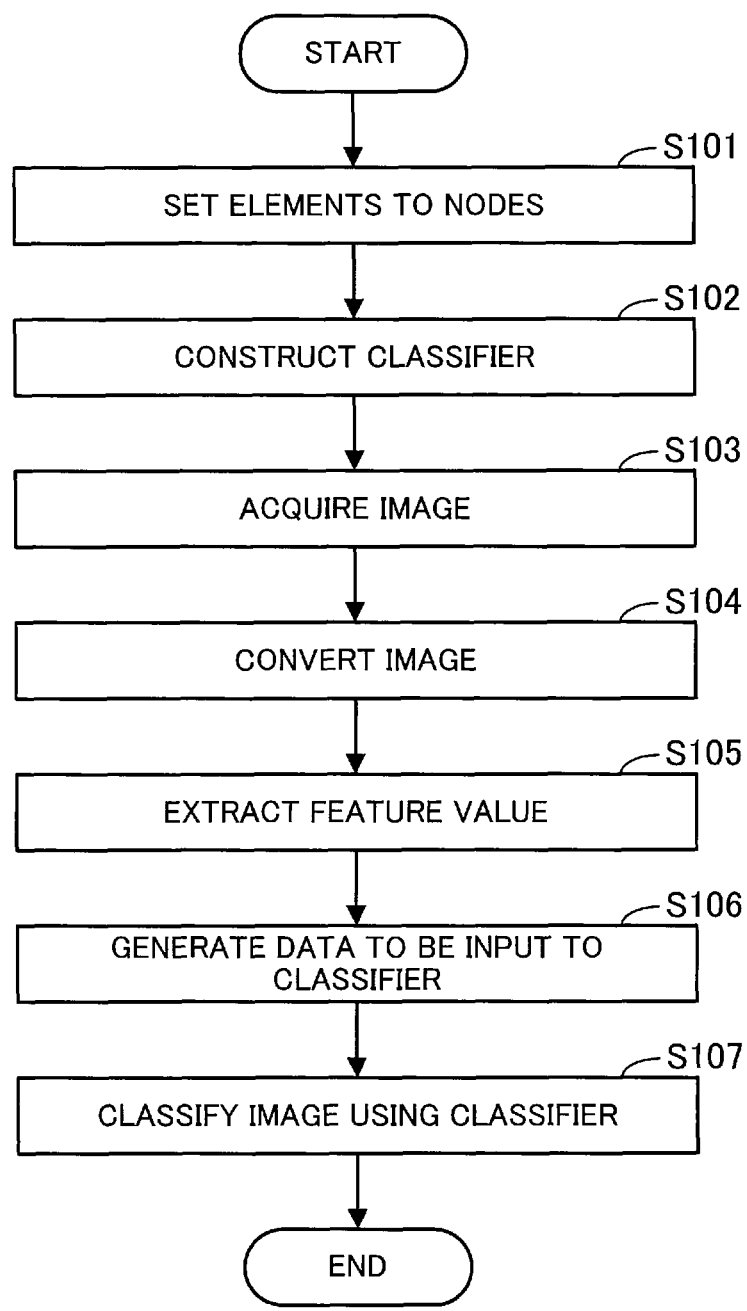
FIG. 15 is a flowchart illustrating an example of image classification procedure based on the output data.

FIG. 15 is a flowchart illustrating an example of image classification procedure based on the output data.

[Step S101] The image classification processing unit 112 sets elements to the nodes in the C, F, and D sections based on the image conversion filter structure 201, the feature extraction filter structure 202, and the data generation module structure 203 of the output data 210 stored in the output data storing unit 133.

[Step S102] The image classification processing unit 112 constructs a classifier based on the classifier information 207 of the output data 210.

[Step S103] The image classification processing unit 112 acquires a classification processing target image via the image acquiring unit 111. This image is, for example, an image captured by the camera 107a.

[Step S104] The image converting unit 122 performs image conversion processing on the acquired image according to image conversion filters assigned to the node in the C section.

[Step S105] The feature extracting unit 123 extracts a feature value from the image converted in step S104 according to feature extraction filters assigned to the nodes in the F section.

[Step S106] The input data generating unit 124 generates input data to be input to the classifier based on the feature value extracted in step S105 according to input data generation modules assigned to the nodes in the D section.

[Step S107] The classification processing unit 128 uses the classifier constructed based on the classifier information 207 of the output data 210 to thereby perform classification processing for determining to which class the acquired image belongs, based on the input data generated in step S106, and output the classification result.

In addition, in the case where new sample images are obtained, the classifier may be relearned using those sample images and the output data.

Figure 16:
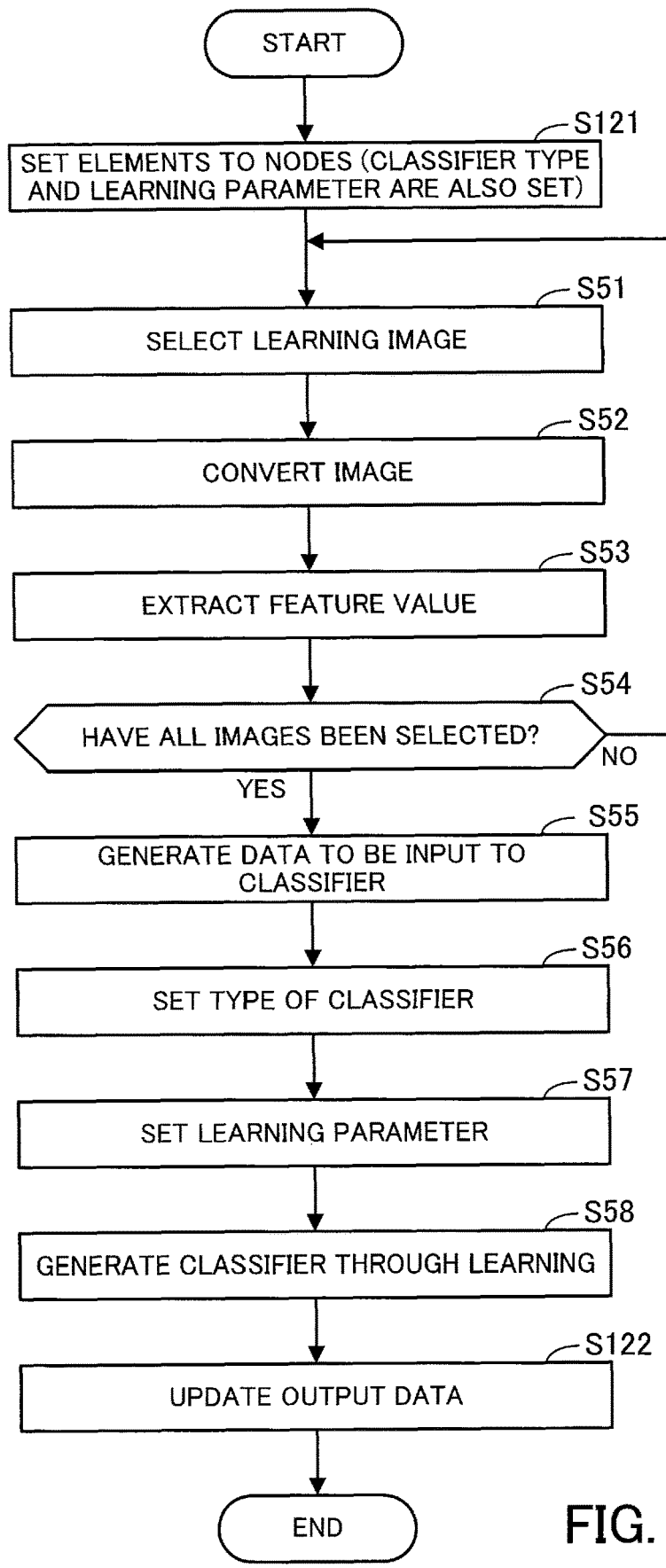
FIG. 16 is a flowchart illustrating an example of classifier relearning procedure.

FIG. 16 is a flowchart illustrating an example of classifier relearning procedure.

[Step S121] The GP learning control unit 121 sets elements to the nodes in the C, F, D, T, Pa, Pr, and L sections based on the image conversion filter structure 201, the feature extraction filter structure 202, the data generation module structure 203, the classifier type setting module information 204, the parameter setting module information 205, and the classifier generation module information 206 of the output data 210 stored in the output data storing unit 133. This step differs from step S101 of FIG. 15 in that a classifier type and a learning parameter are also set based on the output data 210.

Subsequently, similar procedure to steps S51 to S58 of FIG. 10 is performed based on the elements set in step S121, using newly prepared sample images as learning images. Note that the learning processing in step S58 here uses labels attached to the newly prepared sample images.

[Step S122] The GP learning control unit 121 updates the classifier information 207 of the output data 210 with the classifier information generation in step S58.

(c) Modifications of Second Embodiment

Next described are modifications obtained by changing part of the processing of the image processor 100 according to the second embodiment. The modifications are described below using the same reference numerals as those of the structural elements of the image processor 100 according to the second embodiment.

In generating an image classification program, only elements of nodes belonging to particular sections may be optimized by genetic programming. For example, the GP learning control unit 121 is able to control the program generation processing in such a manner as to optimize only elements of the nodes in the T, Pa, Pr, and L sections. In this case, in the respective initial individuals included in the individual group, a predetermined element is assigned to each node in the C, F, and D sections. Then, during the program generation processing, only elements of the nodes in the T, Pa, Pr, and L sections are targets for evolution while no changes are made to the elements of the respective nodes in the C, F, and D sections. Such control allows only the classifier generation algorithms to be optimized.

In addition, the processing for optimizing only elements of the nodes belonging to particular sections is employed, for example, to optimize penalty terms used for the fitness score calculation. For example, optimization of the number of feature dimensions used as a penalty term is achieved by optimizing, using genetic programming, the procedure up to the generation of the input data based on the image feature value. Specifically, only elements of the respective nodes in the C, F, and D sections or the F and D sections need to be optimized. In addition, in order to optimize the number of support vectors in SVM used as the penalty term, it is effective to optimize the procedure for classifier generation. Therefore, only elements of the respective nodes in the T, Pa, Pr, and L sections need to be optimized.

Further, there are provided a plurality of operation modes each for optimizing only elements of nodes in a different section, and the operation modes may be switched according to predetermined conditions. Assume in the following modification that there are provided the following three switchable operation modes: Operation Mode 1 for optimizing only elements of the nodes in the C section; Operation Mode 2 for optimizing only elements of the nodes in the F and D sections; and Operation Mode 3 for optimizing only elements of the nodes in the T, Pa, Pr, and L sections. That is, Operation Mode 1 achieves optimization of the algorithms concerning the learning image conversion. Operation Mode 2 achieves optimization of the algorithms concerning the generation of the input data to be input to the classifier based on the converted images. Operation Mode 3 achieves optimization of the algorithms concerning the classifier generation.

Figure 17:
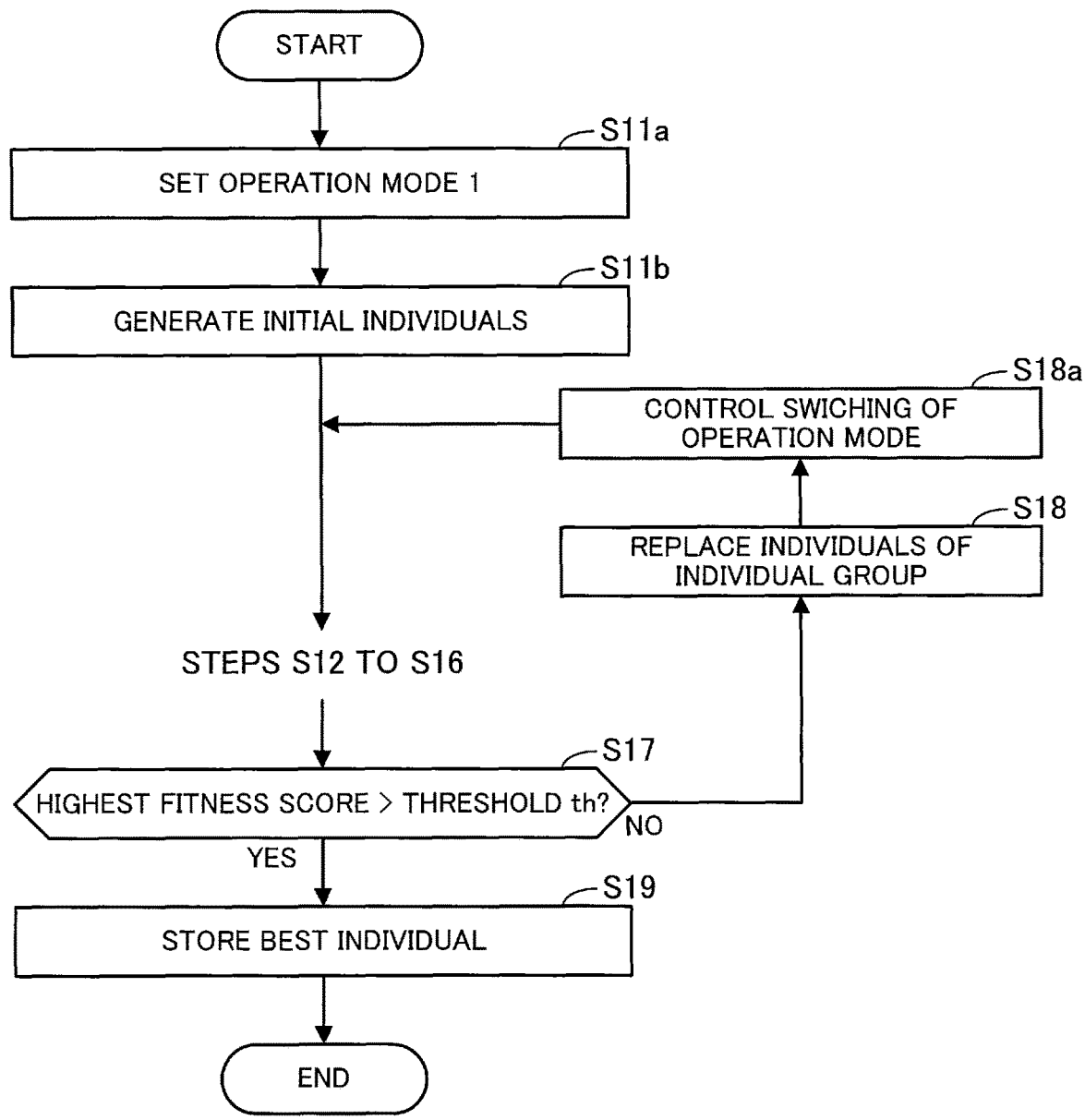
FIG. 17 is a flowchart illustrating an example of image classification program generation procedure according to a modification.

FIG. 17 is a flowchart illustrating an example of image classification program generation procedure according to a modification. In FIG. 17, the same step numbers are given to steps with processing details that are common to those of FIG. 7.

[Step S11*a*] The GP learning control unit 121 sets its operation mode to Operation Mode 1.

[Step S11*b*] The GP learning control unit 121 generates a plurality of initial individuals and stores information indicating the generated initial individuals in the individual group information storing unit 132. This step differs from step S11 of FIG. 7 in that, for all the individuals, predetermined elements are assigned to the nodes in sections other than the C section.

Subsequently, steps S12 to S17 of FIG. 7 are carried out. Note however that, in generating the child individuals in step S13, only elements of the nodes in a particular section are targets for evolution. Specifically, in Operation Mode 1, only elements of the nodes in the C section are targets of evolution; in Operation Mode 2, only elements of the nodes in the F and D sections are targets of evolution; and in Operation Mode 3, only elements of the nodes in the T, Pa, Pr, and L sections are targets of evolution.

Then, in step S17, if the highest fitness score amongst the fitness scores calculated for the respective child individuals is less than or equal to the threshold th, the GP learning control unit 121 moves to step S18*a* after performing step S18.

[Step S18*a*] The GP learning control unit 121 determines whether a condition for switching the operation mode has been satisfied and then switches the operation mode according to the result of the determination. If the current operation mode is Operation Mode 1, it is switched to Operation Mode 2. If the current operation mode is Operation Mode 2, it is switched to Operation Mode 3. Then, step S12 and the subsequent steps are performed again.

Switching the operation mode when the increase in a fitness score has reached a plateau, for example, is one conceivable way of switching the operation mode. Specifically, the GP learning control unit 121 switches the current operation mode to the next operation mode when the rate of increase in the highest fitness score calculated in step S16 is less than or equal to a predetermined threshold. This allows sequential optimization of elements of the nodes in each section. Alternatively, the GP learning control unit 121 may switch the operation mode from Operation Mode 1 to Operation Mode 2 when the number of generations of the individual group has reached a first predetermined number, and may switch the operation mode from Operation Mode 2 to Operation Mode when the number of generations has reached a second predetermined number which is greater than the first predetermined number.

Note that the processing functions of each of the apparatuses (the program generating apparatus 1 and the image processor 100) described in the embodiments above may be achieved by a computer. In this case, a program is made available in which processing details of the functions to be provided to each of the above-described apparatuses are described. By executing the program on the computer, the above-described processing functions are achieved on the computer. The program in which processing details are described may be recorded in a computer-readable recording medium. Such computer-readable recording media include a magnetic-storage device, an optical disk, a magneto-optical recording medium, and a semiconductor memory. Examples of the magnetic-storage device are a hard disk drive (HDD), a flexible disk (FD), and a magnetic tape. Example of the optical disk are a digital versatile disc (DVD), a DVD-RAM, a compact disc-read only memory (CD-ROM), a CD-recordable (CD-R), and a CD-rewritable (CD-RW). An example of the magneto-optical recording medium is a magneto-optical disk (MO).

In the case of distributing the program, for example, portable recording media, such as DVDs and CD-ROMs, in which the program is recorded are sold. In addition, the program may be stored in a storage device of a server computer and then transferred from the server computer to another computer via a network.

A computer for executing the program stores the program, which is originally recorded in a portable storage medium or transferred from the server computer, in its own storage device. Subsequently, the computer reads the program from the storage device and performs processing according to the program. Note that the computer is able to read the program directly from the portable storage medium and perform processing according to the program. In addition, the computer is able to sequentially perform processing according to a received program each time such a program is transferred from the server computer connected via a network.

According to one aspect, it is possible to generate an image classification program offering highly accurate image classification processing.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A program generating apparatus comprising:
a processor configured to perform a procedure including:
performing a generation process for generating a plurality of tree structures each representing an image classification program and having a first level group and a second level group each including one or more adjacent hierarchical levels, a plurality of elements of a plurality of nodes in the first level group being selected from amongst a plurality of image filters each used to apply preprocessing to an input image, an element of a node in the second level group being selected from amongst a plurality of setting programs each used to set a different value as a control parameter for generating a classifier through learning based on information obtained by treating a plurality of learning images with execution of the plurality of elements selected for the plurality of nodes in the first level group;
determining, using genetic programming, a tree structure including a combination of a plurality of first image filters and a first setting program, the plurality of first image filters being selected from amongst the plurality of image filters as the plurality of elements of the plurality of nodes in the first level group, the first setting program being selected from amongst the plurality of setting programs as the element of the node in the second level group, by calculating a fitness score of each of the plurality of tree structures and specifying a tree structure of which the fitness score exceeds a predetermined threshold; and
outputting the tree structure obtained by the determining.

2. The program generating apparatus according to claim 1, wherein:
each of the plurality of tree structures further has a third level group; and
an element of a node in the third level group is selected from amongst a plurality of type setting programs each used to set a type of the classifier generated based on the information.

3. The program generating apparatus according to claim 2, wherein:
one or more of the plurality of setting programs each used to set the different value as the control parameter are stored in memory in association with each of the plurality of type setting programs; and
the element of the node in the second level group is selected from amongst the one or more of the plurality of setting programs associated with the type setting program selected as the element of the node in the third level group.

4. The program generating apparatus according to claim 1, wherein:
each of the plurality of tree structures further has a fourth level group; and
an element of a node in the fourth level group is selected from amongst a plurality of correction programs each used to correct, using a different value, the value of the control parameter set according to the setting program selected as the element of the node in the second level group.

5. The program generating apparatus according to claim 1, wherein:
each of the plurality of image filters is a program used to extract a feature value based on the input image;
each of the plurality of tree structures further has a fifth level group;
an element of a node in the fifth level group is selected from amongst a plurality of data generation programs each used to generate, based on a feature value extracted according to the image filters selected as the plurality of elements of the plurality of nodes in the first level group, input data to be input for generating a classifier based on the element of the node in the second level group; and
the plurality of data generation programs are programs for generating the input data by each receiving a different number of feature value inputs, and a number of nodes included in the first level group changes according to the number of feature value inputs into the data generation program selected as the element of the node in the fifth level group.

6. The program generating apparatus according to claim 1, wherein: the outputting includes repeating an operation beginning with the plurality of tree structures being included in a tree structure group, the operation including:
generating a child tree structure based on a parent tree structure selected from the tree structure group;
generating a classifier through learning by inputting the plurality of learning images to the child tree structure;
calculating a fitness score of the child tree structure based on a classification accuracy rate obtained when classifying a plurality of evaluation images by the classifier; and
replacing the child tree structure with one of the plurality of tree structures included in the tree structure group when the calculated fitness score is less than or equal to the threshold.

7. The program generating apparatus according to claim 6, wherein:
the calculating includes calculating, as the fitness score of the child tree structure, a value obtained by correcting the classification accuracy rate according to a penalty term based on a node configuration of the child tree structure or the classifier generated by the processing based on the child tree structure.

8. The program generating apparatus according to claim 6, wherein:
in a first operation mode the element of the node in the second level group remains fixed during generating the child tree structure, and in a second operation mode the plurality of elements of the plurality of nodes in the first level group remain fixed during generating the child tree structure; and
the operation further includes making a switch from the first operation mode to the second operation mode based on a rate of increase in the fitness score of the child tree structure.

9. A program generating method comprising:
performing, by a computer, a generation process for generating a plurality of tree structures each representing an image classification program and having a first level group and a second level group each including one or more adjacent hierarchical levels, a plurality of elements of a plurality of nodes in the first level group being selected from amongst a plurality of image filters each used to apply preprocessing to an input image, an element of a node in the second level group being selected from amongst a plurality of setting programs each used to set a different value as a control parameter for generating a classifier through learning based on information obtained by treating a plurality of learning images with execution of the elements selected for the plurality of nodes in the first level group;

determining, by the computer, using genetic programming, a tree structure including a combination of a plurality of first image filters and a first setting program, the plurality of first image filters being selected from amongst the plurality of image filters as plurality of elements of the plurality of nodes in the first level group, the first setting program being selected from amongst the plurality of setting programs as the element of the node in the second level group, by calculating a fitness score of each of the plurality of tree structures and specifying a tree structure of which the fitness score exceeds a predetermined threshold; and outputting, by the computer, the tree structure obtained by the determining.

10. A non-transitory computer-readable storage medium storing a computer program that causes a computer to perform a procedure comprising:

performing a generation process for generating a plurality of tree structures each representing an image classification program and having a first level group and a second level group each including one or more adjacent hierarchical levels, a plurality of elements of a plurality of nodes in the first level group being selected from amongst a plurality of image filters each used to apply preprocessing to an input image, an element of a node in the second level group being selected from amongst a plurality of setting programs each used to set a different value as a control parameter for generating a classifier through learning based on information obtained by treating a plurality of learning images with execution of the plurality of elements selected for the plurality of nodes in the first level group;

determining, using genetic programming, a tree structure including a combination of a plurality of first image filters and a first setting program, the plurality of first image filters being selected from amongst the plurality of image filters as the plurality of elements of the plurality of nodes in the first level group, the first setting program being selected from amongst the plurality of setting programs as the element of the node in the second level group, by calculating a fitness score of each of the plurality of tree structures and specifying a tree structure of which the fitness score exceeds a predetermined threshold; and outputting the tree structure obtained by the determining.

\* \* \* \* \*